(12) United States Patent
Schäfer et al.

(10) Patent No.: US 12,126,135 B2
(45) Date of Patent: Oct. 22, 2024

(54) MULTIPASS LASER AMPLIFIER AND NO-OPTICAL-POWER BEAM STEERING ELEMENT

(71) Applicant: Coherent Kaiserslautern GmbH, Kaiserslautern (DE)

(72) Inventors: Christoph O. Schäfer, Dellfeld (DE); Louis McDonagh, Kaiserslautern (DE); Ralf Knappe, Trippstadt (DE)

(73) Assignee: Coherent Kaiserslautern GmbH, Kaiserslautern (DE)

( * ) Notice: Subject to any disclaimer, the term of this patent is extended or adjusted under 35 U.S.C. 154(b) by 880 days.

(21) Appl. No.: 17/078,852

(22) Filed: Oct. 23, 2020

(65) Prior Publication Data

US 2022/0131337 A1 Apr. 28, 2022

(51) Int. Cl.
*H01S 3/23* (2006.01)
*H01S 3/06* (2006.01)
(Continued)

(52) U.S. Cl.
CPC ............ *H01S 3/235* (2013.01); *H01S 3/0606* (2013.01); *H01S 3/08054* (2013.01);
(Continued)

(58) Field of Classification Search
CPC .... H01S 3/2325; H01S 3/0071; H01S 3/0606; G02B 26/08; G02B 26/0891
See application file for complete search history.

(56) References Cited

U.S. PATENT DOCUMENTS

| 5,237,584 A * | 8/1993 | Shannon | H01S 3/09415 |
| | | | 372/99 |
| 6,384,966 B1 * | 5/2002 | Dymott | H01S 3/2333 |
| | | | 359/347 |

(Continued)

FOREIGN PATENT DOCUMENTS

| EP | 3236545 A1 | 10/2017 | |
| FR | 2786938 A1 * | 6/2000 | ........... H01S 3/2333 |
| WO | WO-199708792 A1 | 3/1997 | |

OTHER PUBLICATIONS

S. Forget et al., "New 3D multipass amplifier based on Nd:YAG or Nd:YVO4 crystals," arXiv:physics/0610069v1, 2006. (Year: 2006).*

(Continued)

*Primary Examiner* — Yuqing Xiao
*Assistant Examiner* — Zhengqing Qi
(74) *Attorney, Agent, or Firm* — Morrison & Foerster LLP

(57) ABSTRACT

A multipass laser amplifier includes a mirror, a mirror device, a gain crystal, and refractive or diffractive beam-steering element. The gain crystal is positioned on a longitudinal axis of the multipass laser amplifier between the mirror and the mirror device. The beam-steering element is positioned on the longitudinal axis between the gain crystal and the mirror device. The beam-steering element has no optical power and deflects a laser beam, by refraction or diffraction, for each of multiple passes of the laser beam between the first mirror and the mirror device, such that each pass goes through the gain crystal for amplification of the laser beam and goes through a different respective off-axis portion of the beam-steering element. The no optical power of the beam-steering element enables maintaining a large beam size in the gain crystal, thereby facilitating amplification to high average power.

16 Claims, 12 Drawing Sheets

(51) Int. Cl.
*H01S 3/08* (2023.01)
*H01S 3/081* (2006.01)

(52) U.S. Cl.
CPC ...... *H01S 3/08059* (2013.01); *H01S 3/08095* (2013.01); *H01S 3/081* (2013.01)

(56) References Cited

U.S. PATENT DOCUMENTS

| | | | |
|---|---|---|---|
| 7,006,283 | B2 | 2/2006 | Lefort et al. |
| 2005/0036532 | A1* | 2/2005 | McDonagh ......... H01S 3/09415 372/71 |
| 2009/0316746 | A1* | 12/2009 | Nowak ............... G03F 7/70025 372/55 |
| 2013/0301117 | A1 | 11/2013 | Zapata et al. |
| 2013/0315272 | A1* | 11/2013 | Nowak .................. H01S 3/235 372/38.07 |
| 2015/0070753 | A1* | 3/2015 | Knappe .................. H01S 3/091 359/340 |
| 2017/0227721 | A1* | 8/2017 | Yu ......................... G02B 6/4246 |
| 2020/0343683 | A1* | 10/2020 | Hong .................. H01S 5/06835 |

OTHER PUBLICATIONS

Machine translation of FR2786938A1 (Year: 2000).*
Lister, "Multiple pass optical system," WO1997008792A1 (Year: 1997).*
Fiorentino et al., Generation of ultrabright tunable polarization entanglement without spatial, spectral, or temporal constraints. Physical Review A, vol. 69, Issue 4, id. 041801 (2004). (Year: 2004).*
M. Schulz, R. Riedel, A. Willner, S. Dusterer, M. J. Prandolini, J. Feldhaus, B. Faatz, J. Rossbach, M. Drescher, and F. Tavella, "Pulsed operation of a high average power Yb:YAG thin-disk multipass amplifier," Opt. Express 20, 5038-5043 (2012). (Year: 2012).*
Zhu, H., Yin, X., Chen, L. et al. Directional beaming of light from a subwavelength metal slit with phase-gradient metasurfaces. Sci Rep 7, 12098 (2017). (Year: 2017).*
Forget et al., "A New 3D Multipass Amplifier based on Nd:YAG or Nd:YVO$_4$ Crystals", Applied Physics B, vol. 75, 2002, pp. 1-13.
International Search Report and Written Opinion received for International Patent Application No. PCT/EP2021/078777 mailed on Mar. 22, 2022, 20 pages.
Invitation to Pay Additional Fees received for International Patent Application No. PCT/EP2021/078777 mailed on Feb. 1, 2022, 16 pages.

* cited by examiner

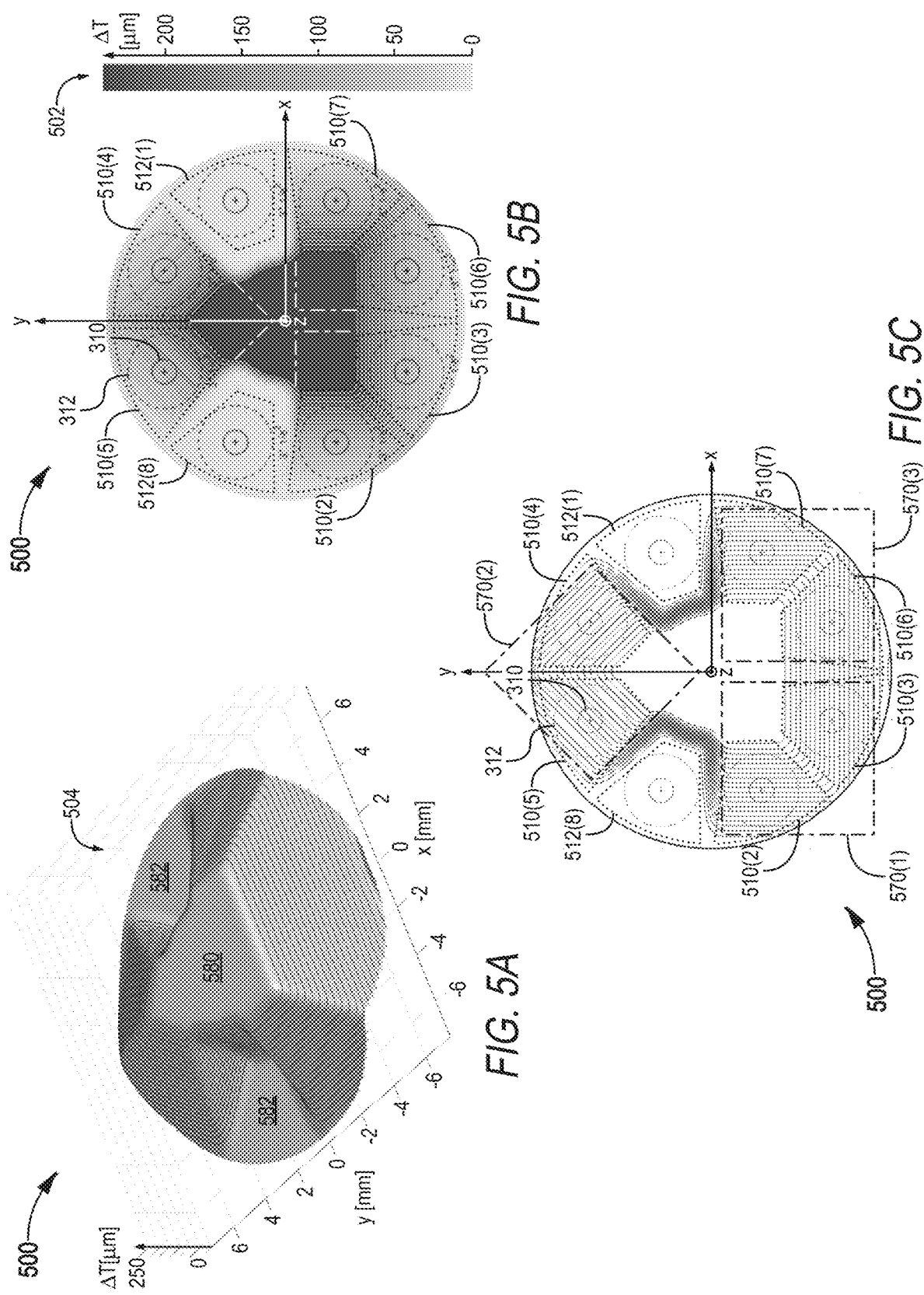

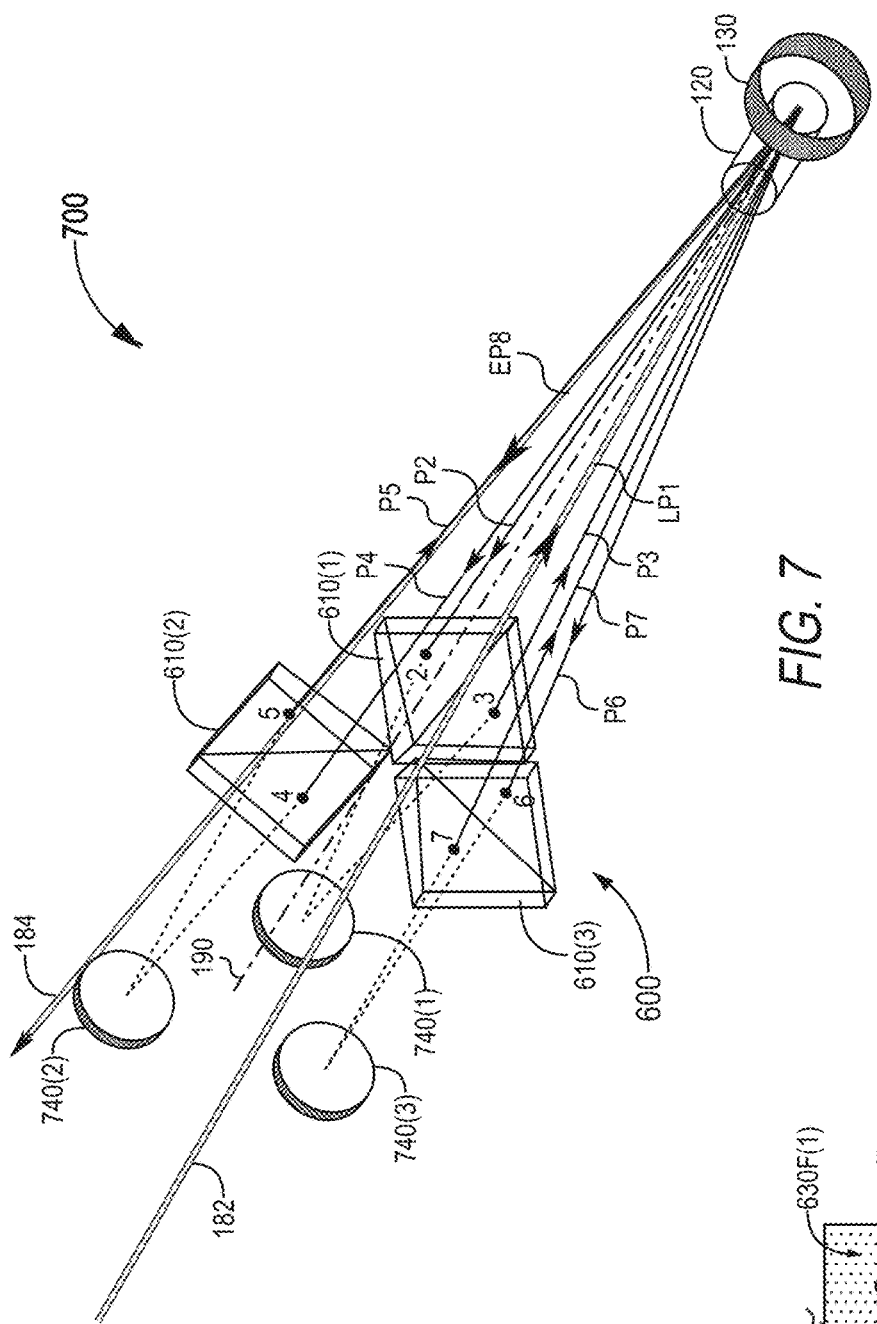
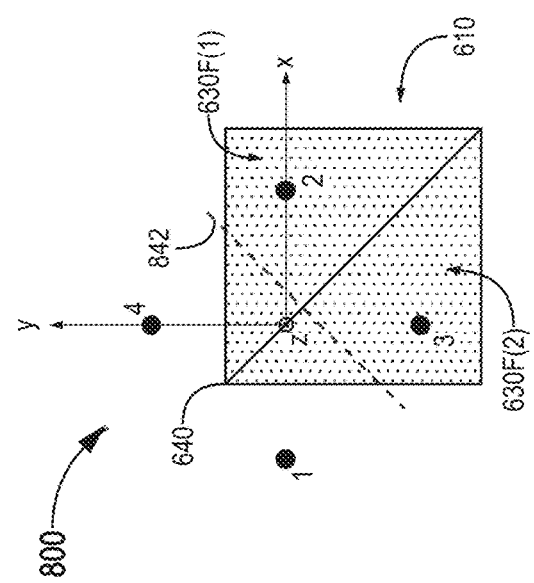
FIG. 7
FIG. 8

MULTIPASS LASER AMPLIFIER AND NO-OPTICAL-POWER BEAM STEERING ELEMENT

TECHNICAL FIELD OF THE INVENTION

The present invention relates in general to laser amplification, in particular to techniques for amplifying laser beams to a high average power.

DISCUSSION OF BACKGROUND ART

A typical arrangement for a high-power laser is a laser resonator, that generates a beam of laser radiation, and one or more laser amplifiers that amplify the power of this beam. Most laser amplifiers use either a bulk crystal or an optical fiber as the gain medium. Fiber amplifiers offer some convenience and are often advantageous but, for generation of laser radiation with a high peak power, the small cross section of the optical fiber leads to undesirable optical nonlinear effects, such as Raman processes transferring energy to other laser wavelengths and stimulated Brillouin scattering causing back-reflection of a portion of the laser radiation. Therefore, when the objective is to generate laser radiation with a high peak power, the preferred gain medium is generally a bulk crystal, typically laser-pumped. Bulk-crystal-based amplifiers include one-pass amplifiers, multipass amplifiers, and regenerative amplifiers.

In a one-pass amplifier, the simplest form of bulk-crystal-based amplifier, the laser beam passes through the gain crystal once. When the amplification of a one-pass amplifier is insufficient, the laser beam path may be arranged to pass through the gain crystal several times. This is the scheme used in multipass and regenerative amplifiers. As used herein, multipass amplifier refers to a configuration where the laser beam makes a finite number of passes through the gain crystal. For example, in a polarization-based scheme, the polarization of the laser beam is manipulated in such a manner that the laser beam makes four passes through the gain crystal along the same path. In an angle-based scheme, the geometric layout of the laser beam path defines a finite number of passes of the laser beam through the gain crystal. At least in the case of more than two passes in the angle-based scheme, some or all of the passes take a different path through the gain crystal. In regenerative amplifiers, on the other hand, the laser beam path is a closed loop allowing the laser beam to circulate indefinitely and thus make any number of passes through the gain crystal before being extracted by a fast optical switch. Regenerative amplifiers may offer very high amplification. However, regenerative amplifiers are only useful for pulsed lasers with pulse durations that are short relative to the roundtrip time on the closed loop, and the optical switching adds complexity and, especially, cost. Multi-stage amplifier systems, e.g., a chain of separate one-pass amplifiers, are an alternative to multipass amplifiers. However, because multipass amplifiers need only a single gain medium and a single associated pump stage, multipass amplifiers can be made more compact and more affordable than multistage amplifier systems.

In multipass amplifiers, the primary complexity lies in the design of the folded beam path and the alignment of optical elements used to achieve this beam path. When the gain crystal is laser-pumped, optimal performance requires each pass through the gain crystal to spatially overlap well with the pump beam. In a conceptually simple design, a different mirror pair is used to redirect the laser beam back to the gain crystal after each of several passes. For example, two mirror pairs may be used to achieve three passes through the gain crystal. When a higher number of passes is needed, this mirror-pair-based scheme may become both complex and bulky.

An 8-pass amplifier with a more compact design and fewer elements is presented in "A new 3D multipass amplifier based on Nd:YAG or Nd:YVO$_4$ crystals", Forget et al., *Applied Physics B* 75, 481-485 (2002). This 8-pass amplifier includes a mirror, a gain crystal, a group of retroreflectors, and a lens. The laser beam is reflected multiple times between the mirror and the group of retroreflectors. The gain crystal is disposed on the optical axis between the mirror and the group of retroreflectors, and the lens is disposed between the gain crystal and the group of retroreflectors. The lens cooperates with the group of retroreflectors to steer each pass of the laser beam. Each pass takes a different path and passes through a different off-axis portion of the lens, but all passes converge at the optical axis in the gain crystal. When the laser beam passes through the lens in the direction toward the gain crystal, the lens steers the laser beam toward the optical axis to pass through the gain crystal while also bringing the laser beam to a focus in or near the gain crystal. When the laser beam passes through the lens in the direction toward the group of retroreflectors, the lens collimates the laser beam.

SUMMARY OF THE INVENTION

We have realized that amplification of a seed laser beam to a high average power in a multipass laser amplifier with a laser-pumped gain crystal requires, or at least strongly benefits from, the pump laser beam having (a) a high power, e.g., hundred watts or more, and (b) a large size, e.g., at least a millimeter in diameter, in the gain crystal. The large pump beam size serves to avoid the pump beam damaging the gain crystal. Additionally, since optimal performance with maximum extraction of the available gain in the energized gain crystal and good mode quality of the amplified laser beam is achieved when the pump beam and the seed beam have comparable beam sizes in the gain crystal, the corresponding large seed beam size prevents the seed beam from damaging the gain crystal as it is amplified to high average power and high peak power. The large pump beam size also reduces the maximum temperature in the gain crystal and helps minimizing the thermal lens in the gain crystal. At high pump intensities within the gain material, the temperature dependence of the thermal conductivity and temperature dependence of the thermo-optic coefficient cause aberrations in the thermal lens. These aberrations will ultimately limit the amplified power that can be extracted from the amplifier. Self-absorption of the amplified seed beam may further contribute to aberrations in the thermal lens. A large pump beam size is preferable also for this reason. In addition, a large pump beam size helps reduce the risk of parasitic self-Raman conversion and self-phase modulation.

Disclosed herein are new multipass laser amplifier designs that meet the conditions outlined above. The present multipass laser amplifiers utilize no-optical-power beam steering elements (BSEs) to keep the seed beam size large in the gain crystal. The multipass laser amplifiers are therefore capable of amplifying a laser beam, continuous-wave or pulsed, to a high average power, for example between 50 and 100 watts. The multipass laser amplifiers may operate with a net gain as large as 50,000. With these capabilities, the multipass laser amplifiers may be used in micromachining applications, for example to amplify picosecond or femtosecond laser beams with an average power of only about 1-10 milliwatts to achieve pulse energies sufficient for micromachining processes. The multipass laser amplifiers disclosed herein represent a substantial improvement over conventional multipass laser amplifiers with lens-based beam steering.

Herein, a no-optical-power optical element is an optical element that, at least where the optical element interacts with a laser beam, has zero optical power or a non-zero optical power corresponding to a focal length of at least one meter. The term "no-optical-power" encompasses BSEs that have zero optical power to within manufacturing tolerances, for example, with an at least one-meter focal length of any portions of the BSE that has incidental optical power and interacts with a laser beam.

The no-optical-power BSEs may be refractive, diffractive, or reflective. In each case, the no-optical-power BSE directs the seed beam through the gain crystal several times. In contrast to conventional multipass laser amplifiers with lens-based beam steering, the present no-optical-power BSEs do not impose any significant focusing of the seed beam, and the seed beam size therefore remains large through the gain crystal. The present multipass laser amplifiers may be realized with surprisingly simple and elegant optical layouts, and may therefore be relatively compact and contain relatively few optical elements.

In one aspect, a multipass laser amplifier includes a mirror, a mirror device, a gain crystal, and a refractive or diffractive beam-steering element. The gain crystal is positioned on a longitudinal axis of the multipass laser amplifier between the mirror and the mirror device. The beam-steering element is positioned on the longitudinal axis between the gain crystal and the mirror device. The beam-steering element has no optical power and is configured to deflect a laser beam, by refraction or diffraction, for each of multiple passes of the laser beam between the mirror and the mirror device, such that each of the multiple passes goes through the gain crystal for amplification of the laser beam and goes through a different respective off-axis portion of the beam-steering element that is a distance away from the longitudinal axis.

In another aspect of the invention, a no-optical-power refractive beam-steering element includes a plurality of transmissive wedges distributed about an optical axis of the beam-steering element. Each wedge has no optical power and is defined by two surfaces facing in opposite directions along the optical axis. The thickness, along the optical axis, of each wedge between the two surfaces decreases with distance from the optical axis and decreases along one azimuthal direction about the optical axis.

In yet another aspect of the invention, a multipass laser amplifier includes a mirror, a mirror device, a gain crystal, and a reflective beam-steering element. The gain crystal is positioned on a longitudinal axis of the multipass laser amplifier between the mirror and the mirror device. The reflective beam-steering element is positioned on the longitudinal axis on a side of the mirror device and gain crystal that is opposite the mirror. The beam-steering element has no optical power and is configured to reflect a laser beam for each of multiple passes of the laser beam between the mirror and the mirror device, such that each of the multiple passes goes through the gain crystal for amplification of the laser beam and is reflected by a different respective off-axis portion of the beam-steering element that is a distance away from the longitudinal axis.

In a further aspect of the invention, a no-optical-power reflective beam-steering element includes a series of reflective surfaces having no optical power. The series of reflective surfaces is distributed about an optical axis of the beam-steering element. Each reflective surface is at an oblique angle to a plane orthogonal to the optical axis. The series organizes the reflective surfaces in surface pairs such that, for each surface pair as viewed from a frontside of the beam-steering element facing in a first direction along the optical axis, the two reflective surfaces of the surface pair are tilted toward the optical axis and toward each other. Each surface pair is symmetric with respect to reflection in a plane spanned by the optical axis and an associated radial axis between the two reflective surfaces of the surface pair.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIGS. 5A-C illustrate a monolithic no-optical-power refractive BSE, according to an embodiment.

FIG. 7 illustrates a multipass amplifier with a triple-prism BSE and a triple-mirror device, according to an embodiment.

FIG. 8 illustrates a single-prism BSE for steering two internal passes in a 4-pass embodiment of the amplifier of FIG. 1, according to an embodiment.

DETAILED DESCRIPTION OF THE INVENTION

Figure 1:
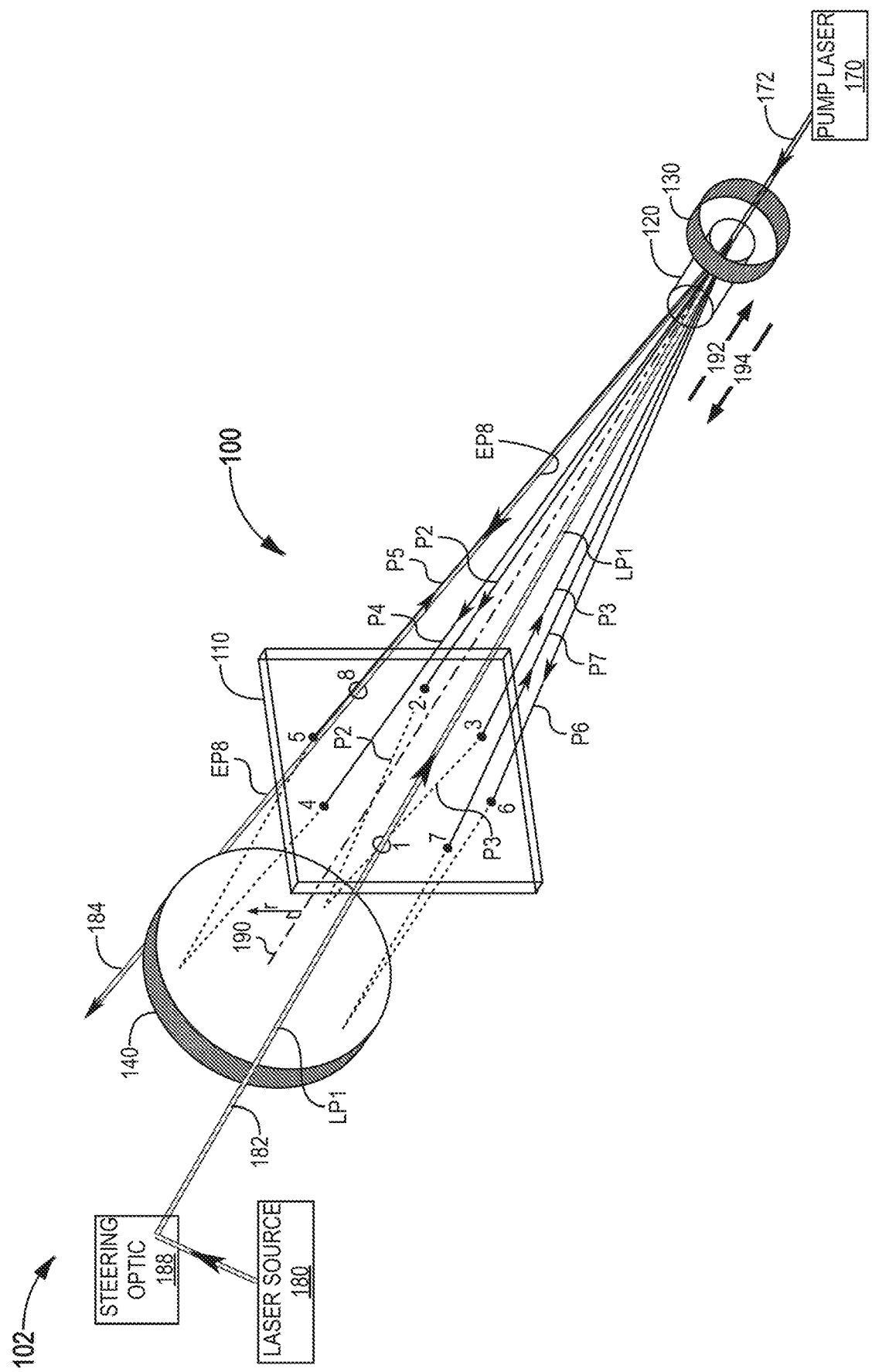
FIG. 1 illustrates a multipass laser amplifier that utilizes a no-optical-power refractive beam steering element (BSE) to direct a seed laser beam through a laser-pumped gain crystal several times, according to an embodiment.

Referring now to the drawings, wherein like components are designated by like numerals, FIG. 1 illustrates one multipass laser amplifier 100 that utilizes a no-optical-power refractive beam steering element (BSE) 110 to direct a seed laser beam 182 through a laser-pumped gain crystal several times. Amplifier 100 includes BSE 110, a gain crystal 120, a mirror 130, and a mirror device 140. Amplifier 100 has a longitudinal axis 190 between mirror 130 and mirror device 140. BSE 110 and gain crystal 120 are positioned on longitudinal axis 190. Although depicted in FIG. 1 as being straight, longitudinal axis 190 may be folded, for example with one or more folding mirrors. BSE 110 steers seed beam 182 to make multiple passes between mirror 130 and mirror device 140 and thereby through gain crystal 120. The steering performed by BSE 110 is deflective and ensures that each pass of seed beam 182 through gain crystal 120 is on or near longitudinal axis 190 so as to overlap with a pump laser beam 172 in gain crystal 120. Importantly, and in contrast to conventional multipass amplifiers with lens-based beam steering, BSE 110 has no optical power and does not significantly focus seed beam 182. The size of seed beam 182 is therefore relatively large in gain crystal 120. As a result, amplifier 100 is capable of amplifying seed beam 182 to a higher power.

As mentioned above, a no-optical-power optical element is an optical element that, at least where the optical element interacts with a laser beam, has zero optical power or a non-zero optical power corresponding to a focal length of at least one meter. Certain embodiments of BSE 110 have zero optical power, at least in the portions of BSE 110 interacting with seed beam 182, and do not focus seed beam 182. Other embodiments of BSE 110 have some optical power, where interacting with seed beam 182, corresponding to a focal length of at least one meter, and therefore weakly focus (or defocus) seed beam 182. As discussed below, BSE 110 includes elements of varying optical thickness to provide refractive deflection of the beams.

FIG. 1 shows amplifier 100 as implemented in a laser amplification system 102 that further includes one or more steering optics 188, and optionally also a laser source 180 and a pump laser 170. Steering optic(s) 188 inject seed beam 182 into amplifier 100. Laser source 180 generates seed beam 182, and pump laser 170 generates pump beam 172. Laser source 180 may be a continuous-wave laser or a pulsed laser, such as picosecond or femtosecond laser.

The wavelength of seed beam 182 may be in the near infrared spectrum (IR-A band), the short-wavelength infrared spectrum (IR-B band), the mid-wavelength infrared spectrum (IR-C band), the visible spectrum, or even the ultraviolet spectrum.

In one example, laser source 180 is a near-infrared pulsed laser generating seed beam 182 with average power in the 1-100 milliwatt range. Gain crystal 120 is, for example, a Yb:YAG, Nd:YAG, or Nd:YVO$_4$ crystal.

Amplifier 100 may be provided as a standalone laser amplifier for amplification of a laser beam provided by a third-party laser source, and with gain crystal 120 being pumped by a third-party pump laser. Similarly, BSE 110 may be provided as a standalone beam steering element to be implemented in a third-party multipass laser amplifier, or another multipass device such as a disk laser.

In operation, seed beam 182 is injected into laser amplifier 100 along an inject path LP1 in the direction toward gain crystal 120 and mirror 130. Inject path LP1 bypasses mirror 140 and passes through or by BSE 110 undeflected. After making a first pass through gain crystal 120 on inject path LP1 in a forward direction 192, seed beam 182 is reflected by mirror 130 to make a second pass through gain crystal 120 in a backward direction 194 and propagates on a path P2 to a location "2" on BSE 110. BSE 110 then transmits and deflects path P2 of seed beam 182, such that seed beam 182 is reflected by mirror device 140 along a path P3 to a location "3" on BSE 110. Here, BSE 110 transmits and deflects path P3 of seed beam 182 to make a third pass through gain crystal 120 before seed beam 182 once again reaches mirror 130. The pattern of the second and third passes is repeated in additional consecutive numbered passes through consecutive numbered locations on BSE 110. During each pass, BSE 110 transmits and deflects seed beam 182. Seed beam 182 is alternately reflected by mirror 130 and mirror device 140. After a final reflection by mirror 130, seed beam 182 makes an eighth pass through gain crystal 120 and leaves amplifier 100 along an eject path EP8 as an amplified laser beam 184.

Each of paths P2-P7 extends between mirror 130 and mirror device 140, and is deflected by BSE 110. For clarity of illustration, paths P2-P7 are shown as solid lines between BSE 110 and mirror 130, and as dashed lines between BSE 110 and mirror device 140. Paths P2-P7 are referred to as internal passes, to distinguish from the initial inject pass along inject path LP1 and the final eject pass along eject path EP8.

In the example depicted in FIG. 1, inject path LP1 and eject path EP8 pass through respective openings or non-deflective portions of BSE 110 (labeled "1" and "8"), such that BSE 110 does not change the angles of paths LP1 and EP8 relative to longitudinal axis 190. This inject and eject configuration maximizes simplicity and compactness of amplifier 100. Alternatively, seed beam 182 is injected into and/or amplified beam 184 is ejected from amplifier 100 between BSE 110 and gain crystal 120, for example with a mirror. In another arrangement, seed beam 182 is injected into and/or amplified beam 184 is ejected from amplifier 100 through a respective deflective portion of BSE 110.

Directing the attention to BSE 110, BSE 110 deflects seed beam 182 for each of the internal passes of the seed beam 182 between mirror 130 and mirror device 140, such that each of the second through seventh passes goes through (a) gain crystal 120 for amplification of seed beam 182 and (b) a different respective off-axis portion of BSE 110 that is a distance away from longitudinal axis 190. For each pass in forward direction 192, BSE 110 deflects seed beam 182 toward longitudinal axis 190. BSE 110 thereby ensures that seed beam 182 passes through gain crystal 120 near or on longitudinal axis 190 to optimally overlap with a pump beam 172. In one example, gain crystal 120 is very close to mirror 130, and BSE 110 is configured such that seed beam 182 reaches longitudinal axis 190 at mirror 130.

It is understood that, e.g., imperfections in the manufacture of BSE 110 may cause BSE 110 to slightly affect the focusing properties of seed beam 182. Herein, the term "no-optical-power" encompasses instances of BSE 110 that have zero optical power to within manufacturing tolerances, for example, with any portions of BSE 110 with incidental optical power and interacting with seed beam 182 having a focal length of at least one meter.

In the example depicted in FIG. 1, amplifier 100 is an 8-pass amplifier with BSE 110 being responsible for beam steering of the six internal passes. More generally, BSE 110 is configured beam steer an even number N of internal passes, such that amplifier 100 is an (N+2)-pass amplifier.

The optimal number of passes depends on a variety of factors. Generally, a higher number of passes comes at the cost of increased alignment complexity, a higher sensitivity to thermo-mechanical distortions, and a higher production cost. On the other hand, a lower number of passes may fail to reach the desired level of amplification and/or only inefficiently extract energy stored in gain crystal 120 by pump beam 172. Efficient energy extraction from gain crystal 120 requires operating near saturation of the gain of crystal 120. A high small-signal gain is beneficial for reaching the saturation condition in a minimal number of passes of seed beam 182 through gain crystal 120. A high small-signal gain is achieved by maximizing parameters such as the intensity of pump beam 172 in gain crystal 120, the doping level of gain crystal 120, and the length of gain crystal 120. However, a high small-signal gain has drawbacks. For example, thermal lensing and any aberrations of the thermal lens in gain crystal 120 strongly increase for high intensities of pump beam 172, which may limit the average power of amplified beam 184, and it may be necessary to operate with a smaller small-signal gain, and thus, a higher number of passes in order to reach the desired level of amplification.

Additional 8-pass embodiments of amplifier 100, each configured with a different beam path than depicted in FIG. 1, are possible with suitable redesign of BSE 110. In one such alternative configuration, the deflection angles imparted by the different portions of BSE 110 intersected by seed beam 182 in the diagram depicted in FIG. 1 are chosen such that, when seed beam 182 enters amplifier 100 along inject path LP1 in direction 192, seed beam 192 passes through location "2" in direction 194, passes through location "7" in direction 192, passes through location "8" (now deflective) in direction 194, passes through location "6" in direction 192, passes through location "5" (now deflective) in direction 194, passes through location "3" in direction 192, and leaves amplifier 100 along eject path EP8 in direction 194 passing through location 4 (now non-deflective).

Mirror device 140 may be a single mirror, as shown in FIG. 1, or a plurality of mirrors each performing one reflection in the path of seed beam 182. For example, in the 8-pass configuration depicted in FIG. 1, mirror device 140 may include three separate mirrors performing the reflections of seed beam 182 between locations "2" and "3" on BSE 110, between locations "4" and "5" on BSE 110, and between locations "6" and "7" on BSE 110, respectively.

In one embodiment, mirror 130 is a planar mirror and each mirror of mirror device 140 is a planar mirror as well. This embodiment is best suited for amplifying an initially collimated seed beam 182. Thermal lensing is, however, likely to occur in gain crystal 120, and another embodiment of amplifier 100 is therefore configured with one or more curved mirrors. In one implementation, the curvatures of mirror 130 and mirror device 140 are chosen to stabilize the size of seed beam 182 in gain crystal 120, such that the size of seed beam 182 in gain crystal 120 is the same for each pass. In this implementation, the curvatures of mirror 130 and mirror device 140 may be set to optimize the overlap between seed beam 182 and pump beam 172 in gain crystal 120. Advantageously in this implementation, seed beam 182 may be shaped, prior to injection into amplifier 100, to match the transverse mode of amplifier 100 defined by the curvatures of mirror 130 and mirror device 140. For example, steering optic(s) 188 may serve to not only steer seed beam 182 into amplifier 100 along inject path LP1 but also shape the transverse mode of seed beam 182. Another benefit of mirror 130 and mirror device 140 being curved is a reduction in alignment sensitivity.

Figure 2:
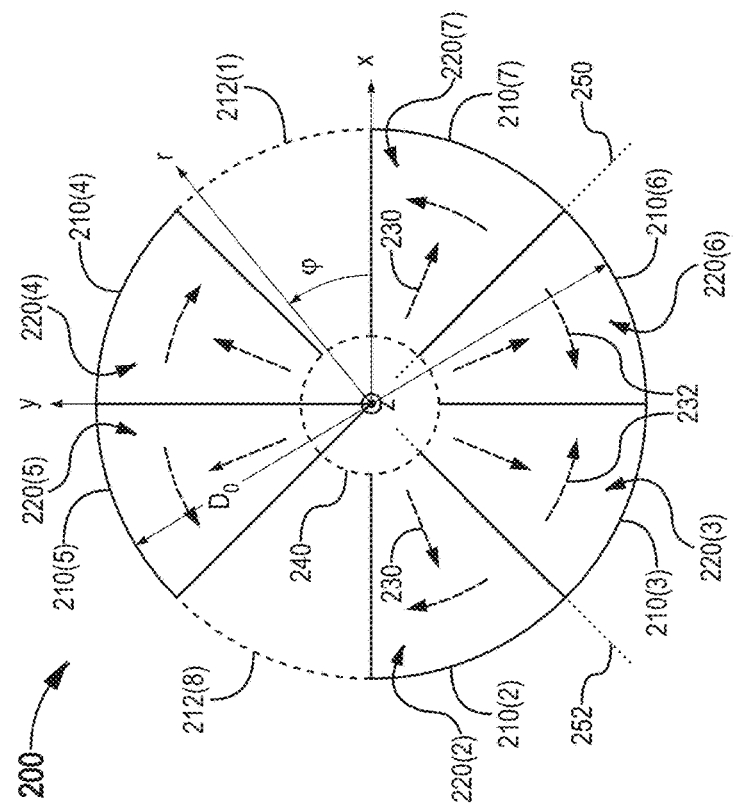
FIG. 2 illustrates a no-optical-power refractive BSE based on transmissive wedges, according to an embodiment.

FIG. 2 illustrates one no-optical-power refractive BSE 200 based on transmissive wedges. BSE 200 is an embodiment of BSE 110 specifically configured to handle beam steering of the internal passes, respectively, of seed beam 182 through the 8-pass embodiment of amplifier 100 depicted in FIG. 1. BSE 200 includes six transmissive wedges 210 arranged about a z-axis, also referred to as the optical axis of BSE 200.

The z-axis is one axis of a cartesian coordinate system further defined by an x-axis and a y-axis. The z-axis is also one axis of a cylindrical coordinate system further defined by a radial r-axis and an azimuthal φ-axis.

When implemented in amplifier 100, the z-axis of BSE 200 is aligned to longitudinal axis 190 and may face toward gain crystal 120 or toward mirror device 140. Each of the six wedges 210 handles the beam steering of a respective one of the internal passes of seed beam 182 through the 8-pass embodiment of amplifier 100 depicted in FIG. 1. In an example where the z-axis of BSE 200 faces mirror device 140, wedge 210(2) includes location "2" of BSE 110 and deflects path P2 of seed beam 182, wedge 210(3) includes location "3" of BSE 110 and deflects path P3 of seed beam 182, etc. This orientation of BSE 200 in amplifier 100 may reduce astigmatism introduced by BSE 200, as compared to when the z-axis of BSE 200 faces gain crystal 120.

Each wedge 210 is defined by two planar surfaces: a front surface 220 facing in the positive z-axis direction, and a back surface facing in the negative z-axis direction. The back surfaces of wedges 210 are hidden from view in FIG. 2. The planarity of front surfaces 220 and the corresponding back surfaces ensures that BSE 200 has no optical power. The thickness, along the z-axis, of each wedge 210 is defined by the distance between front surface 220 and the corresponding back surface. For each wedge 210, front surface 220 and the corresponding back surface are non-parallel, such that the thickness of each wedge 210 is non-uniform.

The thickness of each wedge 210 decreases in the radial direction indicated by radial arrow 230 (for clarity of illustration, only labeled in wedges 210(2) and 210(7)), and decreases also in the azimuthal direction indicated by azimuthal arrow 232 (for clarity of illustration, only labeled in wedges 210(3) and 210(6)). The azimuthal directions 232 of decreasing thickness of wedges 210(2) and 210(3) are mutually opposite, the azimuthal directions 232 of decreasing thickness of wedges 210(4) and 210(5) are mutually opposite, and the azimuthal directions 232 of decreasing thickness of wedges 210(6) and 210(7) are mutually opposite. In one embodiment, wedge 210(3) is the mirror image of wedge 210(2) as reflected in a plane 250 orthogonal to the plane of FIG. 2, wedge 210(5) is the mirror image of wedge 210(4) as reflected in the yz-plane, and wedge 210(7) is the mirror image of wedge 210(6) as reflected in a plane 252 orthogonal to the plane of FIG. 2.

BSE 200 may include non-deflective portions 212(1) and 212(8) arranged to intersect inject path LP1 and eject path EP8, respectively. Non-deflective portions 212(1) and 212(8) have uniform thickness, at least where intersecting seed beam 182. Therefore, non-deflective portions 212(1) and 212(8) do not change the angles of inject path LP1 and eject path EP8 relative to longitudinal axis 190. Instead of including non-deflective portions 212(1) and 212(8), BSE 200 may form one opening between wedges 210(4) and 210(7) allowing passage of seed beam 182 along inject path LP1, and another opening between wedges 210(2) and 210(5) allowing passage of amplified beam 184 along eject path EP8. In an embodiment, a central portion 240 of BSE 200 on the z-axis is non-deflective, or BSE 200 forms an opening at the z-axis. Central portion 240 may serve to allow on-axis passes of seed beam 182 through BSE 200 without refraction.

BSE 200 may be monolithic or composed of a plurality of separate parts. For example, BSE 200 may include three separate parts respectively forming wedge pair 210(2,3), wedge pair 210(4,5), and wedge pair 210(6,7). Wedge pair 210(2,3), wedge pair 210(4,5), and wedge pair 210(6,7) may be identical.

Without departing from the scope hereof, one or both of front surface 220 and the corresponding back surface of at least one wedge 210 of BSE 200 may be curved, such that each such wedge 210 has a non-zero optical power corresponding to a focal length of at least one meter.

Figure 3:
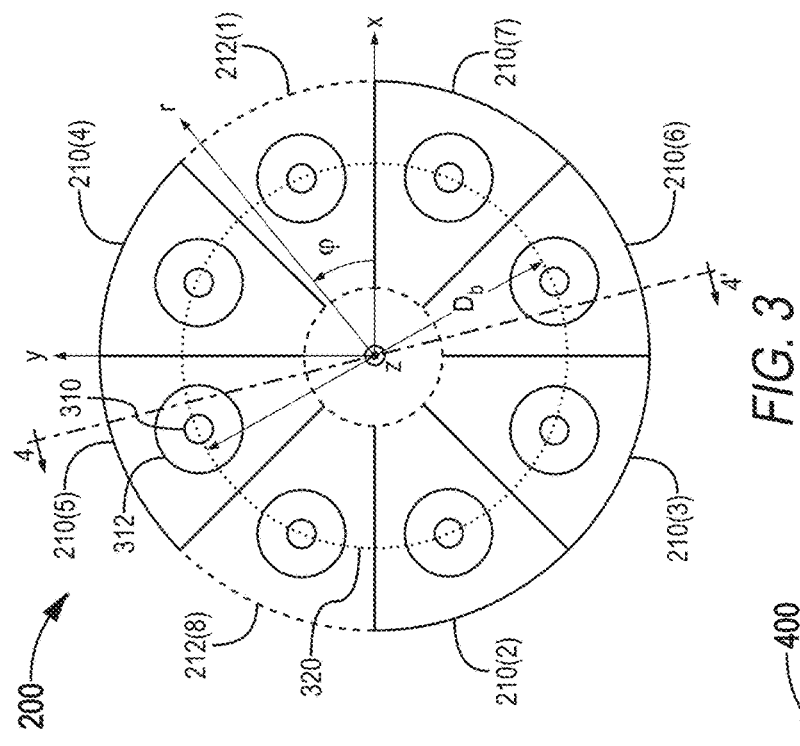
FIG. 3 is a diagram illustrating the positioning of the BSE of FIG. 2 in the path of a seed laser beam in an 8-pass embodiment of the amplifier depicted in FIG. 1, according to an embodiment.

FIG. 3 is a diagram illustrating the positioning of BSE 200 in the path of seed beam 182 in the 8-pass embodiment of amplifier 100 depicted in FIG. 1. Each wedge 210(2-7), as well as each of non-deflective portion or opening 212(1,8), is intersected by a corresponding internal pass of seed beam 182 through amplifier 100. Each pass of seed beam 182 through BSE 200 is indicated by a pair of concentric circles 310 and 312. For example, circle 310 may indicate the 1/e² cross section of seed beam 182, and circle 312 may indicate an area within a diameter that is three times the 1/e² diameter of seed beam 182. The passes of seed beam 182 through BSE 200 fall on a circle 320 centered on the z-axis.

The size of seed beam 182 defines a minimum size of BSE 200, as each wedge 210(2-7) and each non-deflective portion or opening 212(1,8) preferably accommodates passage of seed beam 182 therethrough with a safety margin. The safety margin is designed to eliminate or at least minimize scattering of peripheral portions of seed beam 182 off the intended propagation path through amplifier 100. In an embodiment, each wedge 210 and each non-deflective portion or opening 212 is sized to accommodate an area characterized by a diameter that is four times the 1/e² diameter of seed beam 182. This constraint defines the diameter $D_b$ of circle 320, as well as a minimum value of the diameter $D_0$ of BSE 200 (indicated in FIG. 2). The 1/e² diameter of seed beam 182 may be approximately 1 millimeter (e.g., between 0.7 and 1.3 millimeters). Thus, in one embodiment, diameter $D_b$ is at least approximately 11 millimeters (e.g., in the range between 8 and 15 millimeters), and diameter $D_0$ is approximately 13 millimeters (e.g., in the range between 9 and 17 millimeters). Without departing from the scope hereof, the perimeter of BSE 200 may be non-circular.

Figure 4:
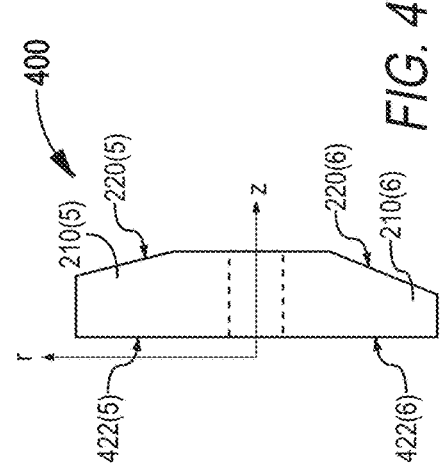
FIG. 4 is a cross-sectional view of a no-optical-power refractive BSE having a planar backside, according to an embodiment.

FIG. 4 is a cross-sectional view of one BSE 400 having a planar backside. BSE 400 is an embodiment of BSE 200. The cross section of FIG. 4 is taken in an rz-plane intersecting wedges 210(5) and 210(6), as indicated by dash-dotted line 4-4' in FIG. 3. In BSE 400, all back surfaces 422 of wedges 210(2-7) are coplanar to form a common planar backside of BSE 400. This planar backside may simplify both manufacturing and alignment of BSE 400. In BSE 400, each surface 220 is tilted away from the z-axis when viewed from the frontside of BSE 400. Surfaces 220(2) and 220(3) are tilted away from each other, surfaces 220(4) and 220(5) are tilted away from each other, and surfaces 220(6) and 220(7) are tilted away from each other, when viewed from the frontside of BSE 400.

FIGS. 5A-C illustrate one no-optical-power refractive monolithic BSE 500. BSE 500 is an embodiment of BSE 400. FIG. 5A is a perspective view of the frontside 504 of BSE 500 (equivalent to the side of BSE 400 including front surfaces 220), with the thickness variation ΔT exaggerated for clarity. FIG. 5B is a contour plot of the thickness variation ΔT of BSE 500, with the thickness variation being indicated by faint contour lines and a grayscale coding defined by bar 502. Darker areas in FIG. 5B correspond to higher portions of frontside 540 in FIG. 5A, both of which correspond to thicker portions of BSE 500. Similarly, brighter areas in FIG. 5B correspond to lower portions of frontside 540, both of which correspond to thinner portions of BSE 500. FIG. 5C is a contour plot of the thickness variation ΔT of BSE 500, with the thickness variation being indicated by contour lines.

BSE 500 includes wedges 510(2-7) and planar portions 512(1) and 512(8). Wedges 510(2-7) are embodiments of wedges 210(2-7), and planar portions 512(1) and 512(8) are embodiments of non-deflective portions 212(1) and 212(8). BSE 500 achieves its greatest thickness at a central planar plateau 580 and its smallest thickness at plateaus 582 of planar portions 512(1) and 512(8). In the example depicted in FIGS. 5A-C, the thickness increases by 250 microns from plateaus 582 to plateau 580, and the diameter of BSE 500 is around 14 millimeters. Without departing from the scope hereof, the span of thickness variation ΔT may be smaller or greater than 250 microns, for example to perform the deflection required by the axial distance (along longitudinal axis 190) between mirror 130 and mirror device 140 in a specific implementation of amplifier 100. In addition, the diameter of BSE 500 may be different from that shown in FIGS. 5A-C, for example to accommodate a seed beam 182 of a particular size. For optimal performance, each of wedges 510(2-7) and planar portions 512(1) and 512(8) may be sized to accommodate seed beam 182 with a safety margin as discussed above in reference to FIG. 3. Furthermore, portions of BSE 500 that do not interact with seed beam 182 may have thicknesses deviating from those indicated in FIGS. 5A-C.

In an embodiment, wedges 510(2), 510(4), and 510(6) are identical, and wedges 510(3), 510(5), and 510(7) are identical, such that the three wedge pairs 210(2,3), 210(4,5), and 210(6,7), are identical.

Without departing from the scope hereof, one or more surfaces of BSE 500 may be curved, such that BSE 500 has a non-zero optical power corresponding to a focal length of at least one meter.

BSE 500 may be machined or molded. For implementation in amplifier 100, BSE 500 is preferably made of glass to withstand the power of seed beam 182 as it is being amplified. As an alternative to the monolithic nature of BSE 500, wedges 510(2-6) may be made as six separate parts.

However, recognizing how wedges 510 are arranged in wedge pairs, each wedge pair 510(2,3), 510(4,5), and 510(6,7) may be a separate part. For example, wedge pairs 510(2,3), 510(4,5), and 510(6,7) may instead be implemented as three separate glass prisms, as indicated by outlines 570(1), 570(2), and 570(3) in FIG. 5C.

Figure 6A:
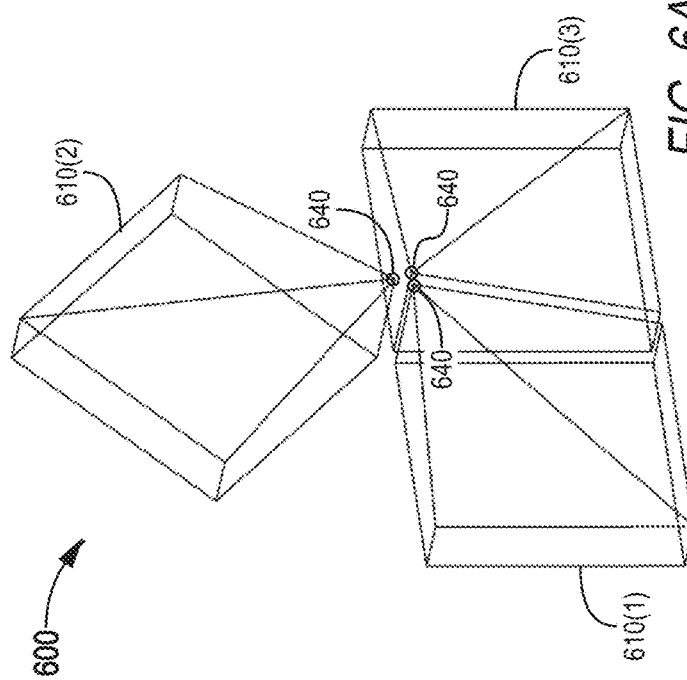
FIGS. 6A-C illustrate a triple-prism no-optical-power refractive BSE, according to an embodiment.
Figure 6B:
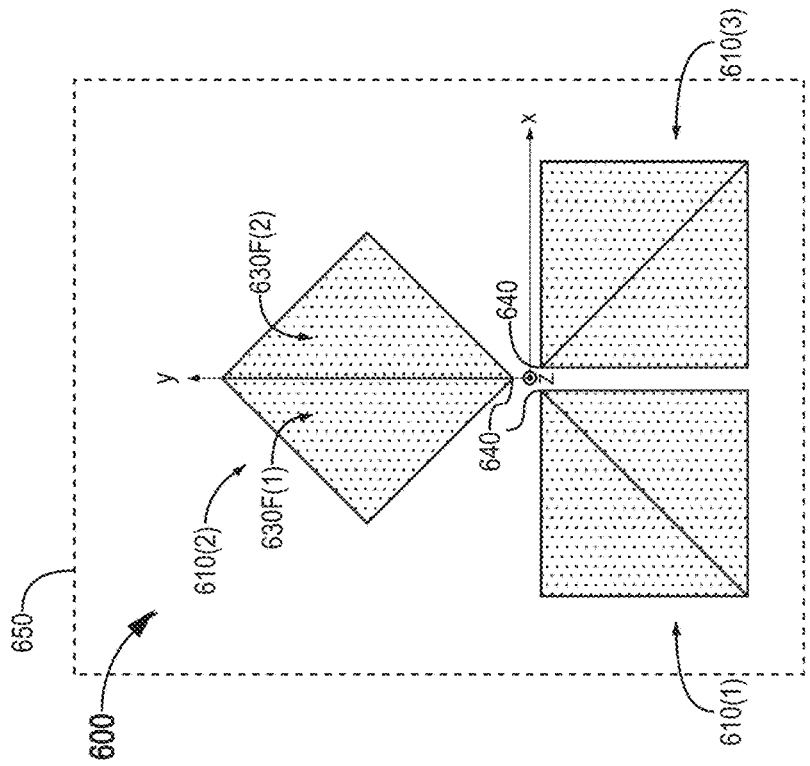
Figure 6C:
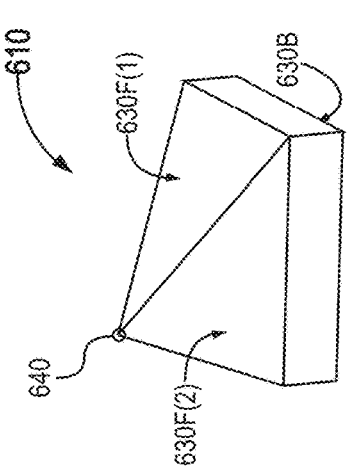

FIGS. 6A-C illustrate one triple-prism no-optical-power refractive BSE 600 that includes three glass prisms 610(1), 610(2), and 610(3). FIG. 6A is a perspective view of BSE 600. FIG. 6B is a front view of BSE 600. FIG. 6C is a perspective view of a single prism 610. BSE 600 is an embodiment of BSE 400. Although prims 610(1-3) may be different from each other, manufacturing simplicity and cost benefit from prisms 610(1-3) being identical and the following discussion of BSE 600 pertains to such an embodiment. Each prism 610 forms an example of wedge pair 210(2,3), and the footprint of primss 610(1-3) in the xy-plane may be as indicated by outlines 570(1-3), respectively, in FIG. 5C.

Each prism 610 corresponds to a quarter of a square pyramid, optionally including an additional square base, and has an apex 640 of greatest thickness. Apexes 640 are arranged to face the z-axis (see FIG. 6B). As shown in FIGS. 6B and 6C, each prism 610 has planar front surfaces 630F(1) and 630F(2), and a planar back surface 630B (hidden from view but yet indicated in FIG. 6C). Front surfaces 630F(1) and 630F(2) face in the positive z-axis direction, while back surface 630B faces in the negative z-axis direction. Back surfaces 630B of prisms 610(1-3) are coplanar and parallel to the xy-plane. Front surfaces 630F(1) and 630F(2) are at an oblique angle to the xy-plane.

The arrangement of prisms 610 in BSE 600 forms one opening between prisms 610(1) and 610(2) and another opening between prisms 610(2) and 610(3). These two openings allow passage of seed beam 182 along inject path LP1 and amplified beam 184 along eject path EP8. In an embodiment, prisms 610 are positioned at respective azimuthal angles of 0, +135, and −135 degrees (as referenced to the y-axis in FIG. 6B). In one implementation, prisms 610 of BSE 600 are mounted to a common fixture 650, as shown in FIG. 6B.

Since prisms 610 must be individually mounted, a potential for misalignment between the three prisms 610 exists. Monolithic BSE 500 is well-suited for implementation in amplifier 100 together with a single-mirror embodiment of mirror device 140, since a small misalignment of monolithic BSE 500 may be corrected for by a compensating adjustment of such a single-mirror embodiment of mirror device 140. In contrast, a single-mirror embodiment of mirror device 140 is not able to compensate for misalignment between individual prisms 610 of triple-prism BSE 600. Therefore, embodiments of amplifier 100 implementing triple-prism BSE 600 advantageously implement a triple-mirror embodiment of mirror device 140.

Without departing from the scope hereof, one or more of surfaces 630F(1), 630F(2), and 630B of at least one prism 610 of BSE 600 may be curved, such that each such prism 610 has a non-zero optical power corresponding to a focal length of at least one meter.

Although not shown in FIGS. 6A-C, each prism 610 may be chamfered to form an opening sufficiently large to accommodate an on-axis pass through of seed beam 182 with no deflection.

FIG. 7 illustrates one multipass amplifier 700 with triple-prism BSE 600 and a triple-mirror embodiment of mirror device 140. Amplifier 700 is an 8-pass embodiment of amplifier 100. Amplifier 700 is configured with triple-prism BSE 600 and implements mirror device 140 as three separate mirrors 740(1), 740(2), and 740(3). Mirror 740(1) is responsible for the reflection of seed beam 182 from location "2" to location "3" on prism 610(1), mirror 740(2) is responsible for the reflection of seed beam 182 from location "4" to location "5" on prism 610(2), and mirror 740(3) is responsible for the reflection of seed beam 182 from location "6" to location "7" on prism 610(3). Thus, each mirror 740 cooperates with a corresponding prism 610. If one prism 610 is misaligned, the corresponding mirror 740 may be adjusted to compensate for this misalignment.

The above discussion of FIGS. 2-7 has been devoted to an 8-pass embodiment of amplifier 100 and associated embodiments of BSE 110. As mentioned in reference to FIG. 1, amplifier 100 is not limited to 8 passes. Amplifier 100 may be designed for any even number of passes greater than or equal to 4. Correspondingly, BSE 110 may be designed to steer all the internal passes of such an amplifier. In a lowest-pass embodiment, BSE 110 steers two internal passes in a 4-pass embodiment of amplifier 100.

FIG. 8 illustrates a single-prism BSE 800 for steering two internal passes in a 4-pass embodiment of amplifier 100. Single-prism BSE 800 includes a single prism 610. Seed beam 182 is initially injected into the 4-pass amplifier along an inject path passing through xy-plane of BSE 800 at a location "1" and making a first pass through gain crystal 120. This inject path bypasses prism 610 of BSE 800. Seed beam 182 then makes two internal passes through amplifier 100, one in backward direction 192 and the other in forward direction 194 (see FIG. 1), before making a final pass through gain crystal 120 while being ejected from the 4-pass amplifier. The two internal passes intersect prism 610 of BSE 800 at locations "2" and "3", respectively, thereof. The paths of seed beam 182 through locations "2" and "3" intersect front surfaces 630F(1) and 630F(2), respectively, of prism 610. The path of the final eject pass through gain crystal 120 bypasses prism 610 and passes through xy-plane of BSE 800 at a location "4".

The general design of prism 610 of BSE 800 is the same as that of prisms 610 of BSE 600. However, the size of prism 610 and the angles of front surfaces 630F(1) and 630F(2) may be different, so as to meet the modified beam-steering requirements of the 4-pass embodiment of amplifier 100. In addition, in BSE 800, prism 610 overlaps with the z-axis (and thus longitudinal axis 190 when implemented in amplifier 100), whereas all prisms 610 of BSE 600 are a distance away from the z-axis. If a non-refractive on-axis portion is required for non-refractive transmission of on-axis passes of seed beam 182 through amplifier 100, prism 610 of BSE 800 may be modified to be flat in a region around the z-axis or prism 610 of BSE 800 may be chamfered to not overlap with the z-axis. For example, prism 610 of BSE 800 may omit the portion that is above/left of line 842 in FIG. 8.

FIG. 8 shows, by example, how BSE 200 can be modified to steer the path of seed beam 182 through amplifier 100 in a manner that achieves fewer than 8 passes. It is also possible to achieve more than 8 passes by arranging additional wedge pairs 210(2,3) (e.g., prisms 610 or wedge pairs 510(2,3)) about the z-axis. When increasing the number of passes beyond 8, it may be necessary to increase the radial size of the corresponding implementation of BSE 110, so as to accommodate each internal pass of seed beam 182 on a corresponding wedge with a safety margin. We have found that as many as 18 internal passes of a seed beam with a $1/e^2$ diameter of 1 millimeter may be accommodated a one-inch optic or optics assembly. Thus, at least as many as 20 passes in total is achievable with amplifier 100 and a 1-millimeter $1/e^2$ seed beam diameter.

An (N+2)-pass embodiment of amplifier 100 is achievable with embodiment of BSE 110 containing N/2 wedge pairs 210(2,3). Embodiments of BSE 110 including two or more wedge pairs may be monolithic (similar to BSE 500) or include separate prisms (similar to BSE 600). When using separate prisms, mirror device 140 may be advantageously implemented as a set of separate mirrors, with each mirror cooperating with a respective prism, as discussed for prisms 610 and mirrors 740 in reference to FIG. 7.

Figure 9:
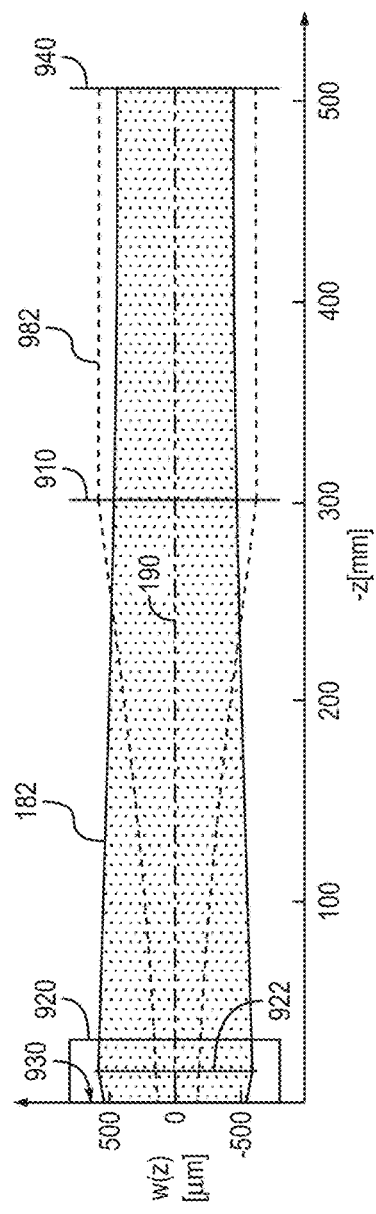
FIG. 9 models the size of the seed laser beam in one example of propagation through a specific implementation of the amplifier of FIG. 1.

FIG. 9 models the size of seed beam 182 in one example of propagation through one specific implementation of amplifier 100. FIG. 9 plots the $1/e^2$ cross section w(z) of seed beam 182 along longitudinal axis 190 between a mirror surface 930 and a mirror surface 940, through a gain crystal 920 placed at mirror surface 930 and through a BSE 910. The horizontal axis of FIG. 9 is indicated as a negative z-axis direction for consistency with the z-axis convention used herein for the BSEs. Longitudinal axis 190 is at w(z)=0. The shaded area indicates the portion of seed beam 182 that is within its $1/e^2$ radius, as seed beam 182 propagates through this implementation of amplifier 100.

Mirror surface 930 is an example of the surface of mirror 130 facing gain crystal 120. Mirror surface 930 is convex, with a 130-millimeter radius of curvature. Gain crystal 920 is an example of gain crystal 120, specifically a 30-millimeter long Nd:YVO$_4$ crystal. The model assumes that thermal lensing takes place in gain crystal 920 with positive optical power and accounts for this by including, at line 922, a thin lens with a focal length of 123 millimeters. Mirror surface 940 represents a mirror surface of mirror device 140 facing BSE 910. Mirror surface 940 is flat. BSE 910 has no optical power. The length of the amplifier between mirror surfaces 930 and 940 is in slight excess of 500 millimeters.

The modeled example is based on the requirement that the $1/e^2$ cross section w(z) must be the same for each sequential pass between mirror surfaces 930 and 940 (regardless of the propagation direction of seed beam 182). The plotted $1/e^2$ cross section w(z) is a consequence of this requirement. FIG. 9 shows that this example of amplifier 100 is capable of maintaining a $1/e^2$ diameter of around 1 millimeter along the full length of the amplifier, with the $1/e^2$ diameter exceeding 1 millimeter throughout propagation through gain crystal 920. This large $1/e^2$ diameter in gain crystal 920 ensures a good overlap with a large pump beam, thereby allowing amplification to a high average power without damaging gain crystal 920, and also minimizing other undesirable effects such as aberrations associated with thermal lensing, parasitic self-Raman conversion, and self-phase modulation.

For comparison, FIG. 9 also shows, with a dashed outline 982, the $1/e^2$ cross section w(z) for an equivalent multipass amplifier using a focusing lens instead of the present no-optical-power refractive BSE. The focusing lens strongly shrinks the $1/e^2$ beam diameter in gain crystal 920 to only 340 microns, which is detrimental for amplification to a high average power. The 340-micron $1/e^2$ beam diameter corresponds to the area of the $1/e^2$ beam cross section being only 0.09 millimeters$^2$. In contrast, the area of the $1/e^2$ beam cross section of seed beam 182 remains greater than 0.9 millimeters$^2$. Thus, the use of a no-optical-power BSE facilitates a ten-fold increase in the cross-sectional area of the pump beam and a corresponding ten-fold reduction in the pump beam intensity.

To achieve the stable $1/e^2$ cross section w(z), plotted in FIG. 9, for repeated passes through the gain crystal, the transverse mode of the incoming seed beam 182 must be matched to the plotted $1/e^2$ cross section w(z).

Figure 10:
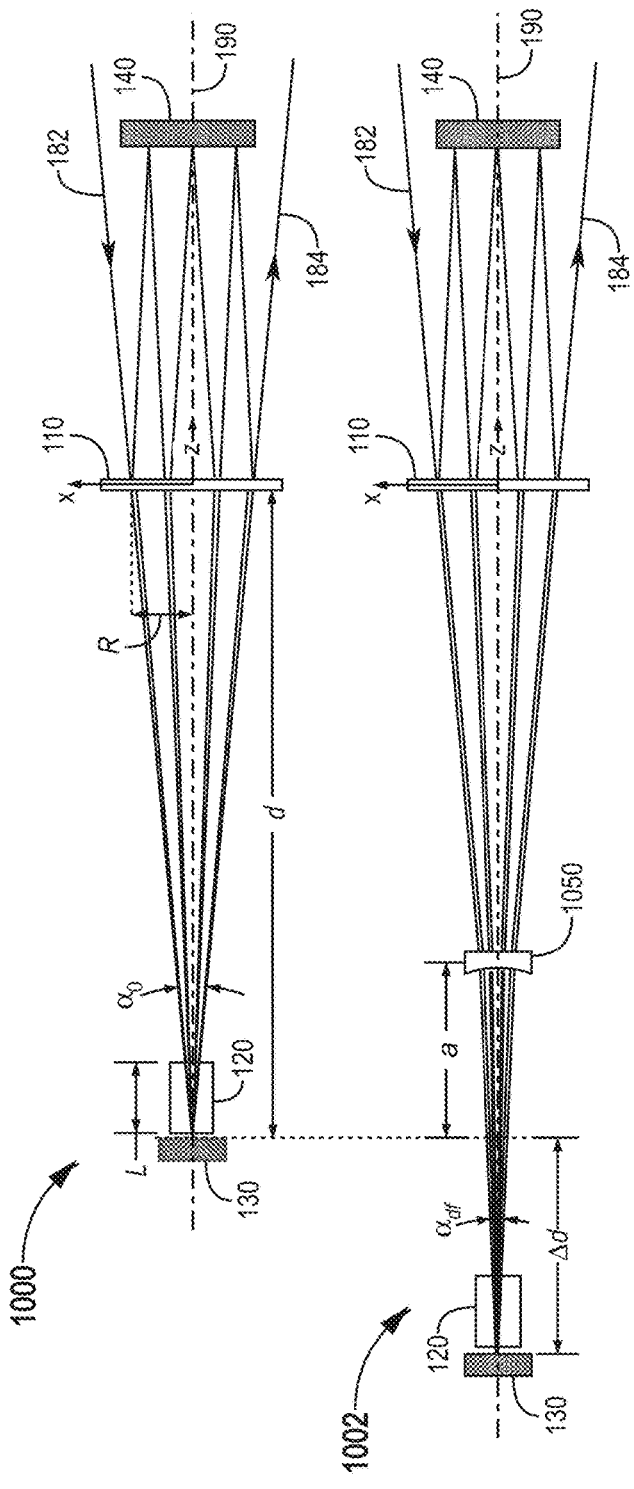
FIG. 10 illustrates use of a defocusing lens in the amplifier of FIG. 1 to further improve the overlap between the seed beam and the pump beam in the gain crystal, according to an embodiment.

FIG. 10 illustrates the use of a defocusing lens in amplifier 100 to further improve the overlap between seed beam 182 and pump beam 172. FIG. 10 shows an a multipass amplifier 1000 that does not have a defocusing lens, and a multipass amplifier 1002 with a defocusing lens 1050. Amplifiers 1000 and 1002 are both embodiments of amplifier 100.

FIG. 10 depicts each of amplifiers 1000 and 1002 in a side view and in 8-pass embodiments. When amplifiers 1000 and 1002 implement BSE 200, BSE 200 may be oriented with its x- and z-axes in the plane of FIG. 10.

In amplifier 1000, the deflection angles of BSE 110 define the propagation angles of seed beam 182 between BSE 110 and gain crystal 110 relative to longitudinal axis 190. Overall, upon entering and leaving gain crystal 120, seed beam 182 spans a non-zero angle $\alpha_0$. Angle $\alpha_0$ is determined by (a) the distance d between BSE 110 and mirror 130 and (b) the radius R of the circle defined by the intersections of BSE 110 and seed beam 182 (e.g., diameter $D_b$ shown in FIG. 3). In one example, where R is 5.75 millimeters and d is 285 millimeters, $\alpha_0$ is 2.3 degrees.

For gain crystals 120 of significant length L along longitudinal axis 190, optimal overlap between the different passes of seed beam 182 and pump beam 172 in gain crystal 120 is achieved when angle $\alpha_0$ is as small as possible, ideally zero. To better approximate this ideal condition, amplifier 1002 incorporates a defocusing lens 1050 between BSE 110 and gain crystal 120. Defocusing lens 1050 is placed a distance $\alpha$ from the location of mirror 130 in amplifier 1000, and causes seed beam 182 to propagate at shallower angles between defocusing lens 1050 and mirror 130. This shifts the point where seed beam 182 reaches longitudinal axis 190 by a distance $\Delta d$. Therefore, mirror 130 and gain crystal 120 are shifted by distance $\Delta d$, relative to their locations in amplifier 1000. The propagation directions of seed beam 182 upon entering and leaving gain crystal 120 in amplifier 1002, span a non-zero angle $\alpha_{df}$ that is less than angle $\alpha_0$. In one example, where defocusing lens 1050 has a focal length of $-143$ millimeters and distance a is 50 millimeters, $\alpha_{df}$ is 1.5 degrees, which is a significant reduction compared to angle $\alpha_0$ of amplifier 1000.

We have found that defocusing lens 1050 improves the overlap between the different passes of seed beam 182 and pump beam 172 in embodiments of amplifier 100 using a 30-millimeter long gain crystal 120, and that this improved overlap increases the amplification by amplifier 100. We have also found, through modeling similar to that of FIG. 9, that defocusing lens 1050 leads to a slight increase in the $1/e^2$ diameter of seed beam 182 within gain crystal 120.

Figure 11:
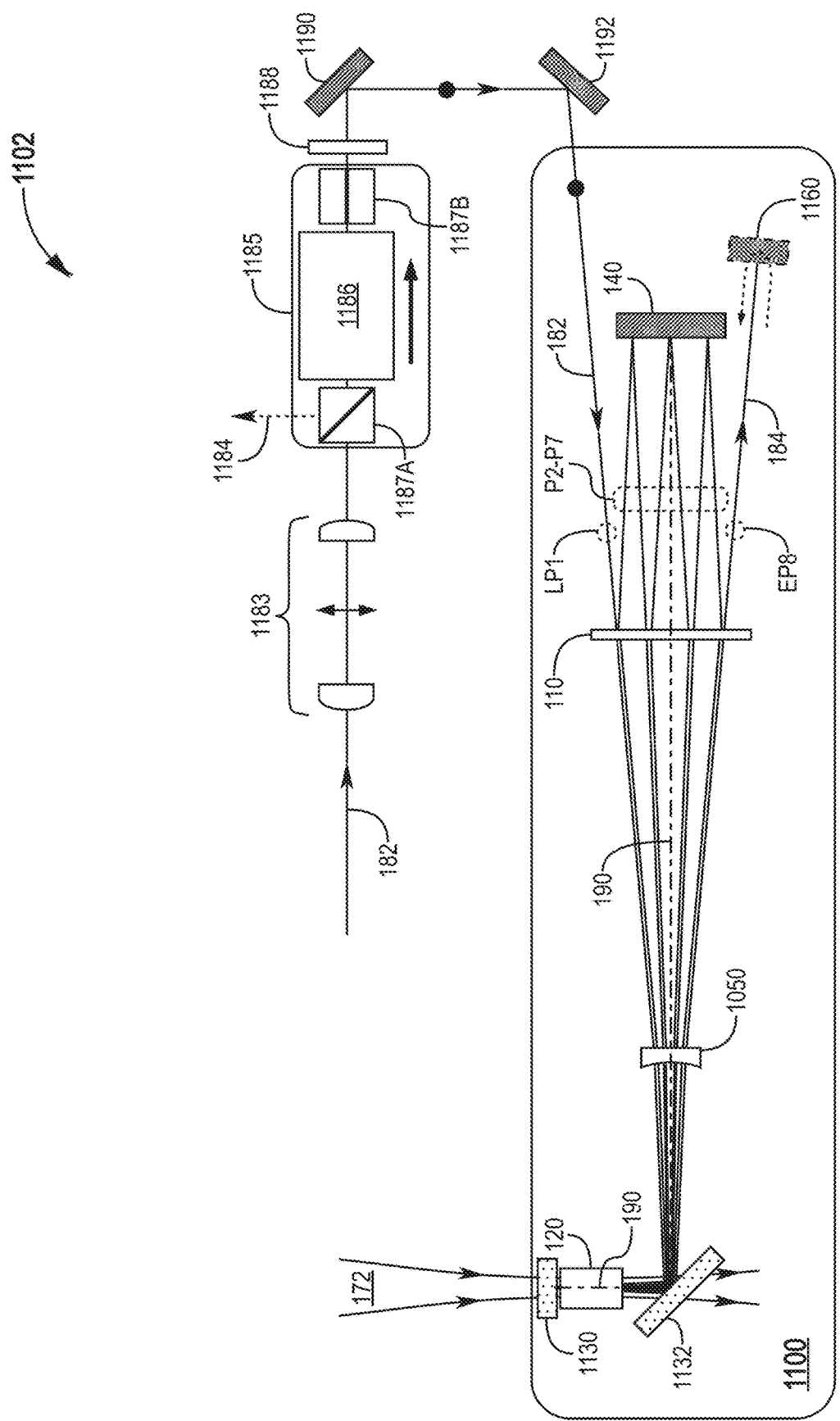
FIG. 11 illustrates a multipass laser amplifier with a no-optical-power refractive BSE, as implemented in a laser amplification system, according to an embodiment. Optionally, the amplifier of FIG. 11 is configured to double the number of passes by retro-reflecting the amplified laser beam.

FIG. 11 illustrates one multipass laser amplifier 1100 with no-optical-power refractive BSE 110, as implemented in one laser amplification system 1102. Optionally, amplifier 1100 is configured to double the number of passes by retro-reflecting amplified beam 184. Amplifier 1100 and system 1102 are embodiments of amplifier 100 and system 102, respectively. In the example depicted in FIG. 11, amplifier 1100 is an 8-pass amplifier designed for 6 internal passes along paths P2-P7. However, amplifier 1100 may more generally be configured as an (N+2)-pass amplifier, wherein N is any even integer greater than or equal to 2, such as an even integer between 2 and 18.

Amplifier 1100 implements mirror 130 as a mirror 1130 reflective to seed beam 182 but transmissive to pump beam 172. Amplifier 1100 further includes a mirror 1132 located on the side of gain crystal 120 opposite mirror 1130. Mirror 1132 is also reflective to seed beam 182 and transmissive to pump beam 172. Mirror 1132, by virtue of being reflective to seed beam 182, folds longitudinal axis 190 between BSE 110 and gain crystal 120. Mirrors 1130 and 1132 allow pump beam 172 to enter amplifier 1100 and be at least partly absorbed by gain crystal 120. Amplifier 1100 may include defocusing lens 1050 positioned between BSE 110 and mirror 1132.

Although not shown in FIG. 11, system 1102 may include several optical elements to direct pump beam 172 into amplifier 1100 through mirror 1130 and otherwise condition pump beam 172. In one embodiment, system 1102 receives pump beam 172 from pump laser 170 (see FIG. 1), for example via an optical fiber. In another embodiment, system 1102 includes pump laser 170 and, optionally, an optically fiber for the delivery of pump beam 172 from pump laser 170.

System 1102 may also include one or more optical elements to direct seed beam 182 into amplifier 1100. For example, system 1102 may include (a) one or more steering optics, such as steering mirrors 1190 and 1192, to direct seed beam 182 into amplifier 1100 along inject path LP1, (b) an optical isolator 1185 to prevent a back-reflection of seed beam 182 or amplified beam 184 from reaching and damaging the laser source used to generate seed beam 182 (e.g., laser source 180 of FIG. 1), and/or (c) a beam shaping module 1183 that modifies the propagation parameters of seed beam 182. Beam shaping module 1183 may be configured to shape the seed beam 182 in a manner that results in a stable $1/e^2$ cross section of seed beam 182 for the multiple internal passes in amplifier 1100. Optical isolator 1185 typically includes two polarizing beamsplitters 1187A and 1187B, and a Faraday rotator 1186 therebetween. In one embodiment, system 1102 receives seed beam 182 from laser source 180, for example via an optical fiber. In another embodiment, system 1102 includes laser source 180 and, optionally, an optical fiber for the delivery of seed beam 182 from laser source 180.

As discussed so far, amplifier 1100 and, more generally, amplifier 100 are designed to achieve an inject pass, an even number of internal passes, and an eject pass. However, the number of passes are easily doubled by retro-reflecting amplified laser beam 184. Thus, in one embodiment, amplifier 1100 further includes a mirror 1160 in the path of amplified beam 184. Mirror 1160 retro-reflects amplified beam 184 to double the number of passes in amplifier 1100. This embodiment of amplifier 1100 is advantageously implemented in an embodiment of system 1102 including optical isolator 1185, such that a twice-amplified laser beam 1184 exiting amplifier 1100 in the backwards direction along inject path LP1 is deflected by polarizing beamsplitter 1187A.

System 1102 may further include a waveplate 1188 that rotates the polarization of seed beam 182, to align the polarization of seed beam 182 with a particular axis of gain crystal 120. In the example depicted in FIG. 11, seed beam 182 is, prior to optical isolator 1185, linearly polarized in the plane of FIG. 11. Optical isolator 1185 rotates the polarization of seed beam 182 by 45 degrees, and waveplate 1188 rotates the polarization of seed beam 182 by an additional 45 degrees, such that seed beam 182, while propagating in amplifier 1100, is linearly polarized orthogonally to the plane of FIG. 11. In embodiments including mirror 1160, amplified seed beam 184 keeps this polarization through its backwards propagation through amplifier 1100, whereafter the action of waveplate 1188 is canceled by the action of Faraday rotator 1186 to make twice-amplified beam 1184 linearly polarized orthogonal to the plane of FIG. 11. As a result, twice-amplified beam 1184 is deflected by polarizing beamsplitter 1187A.

Figure 12:
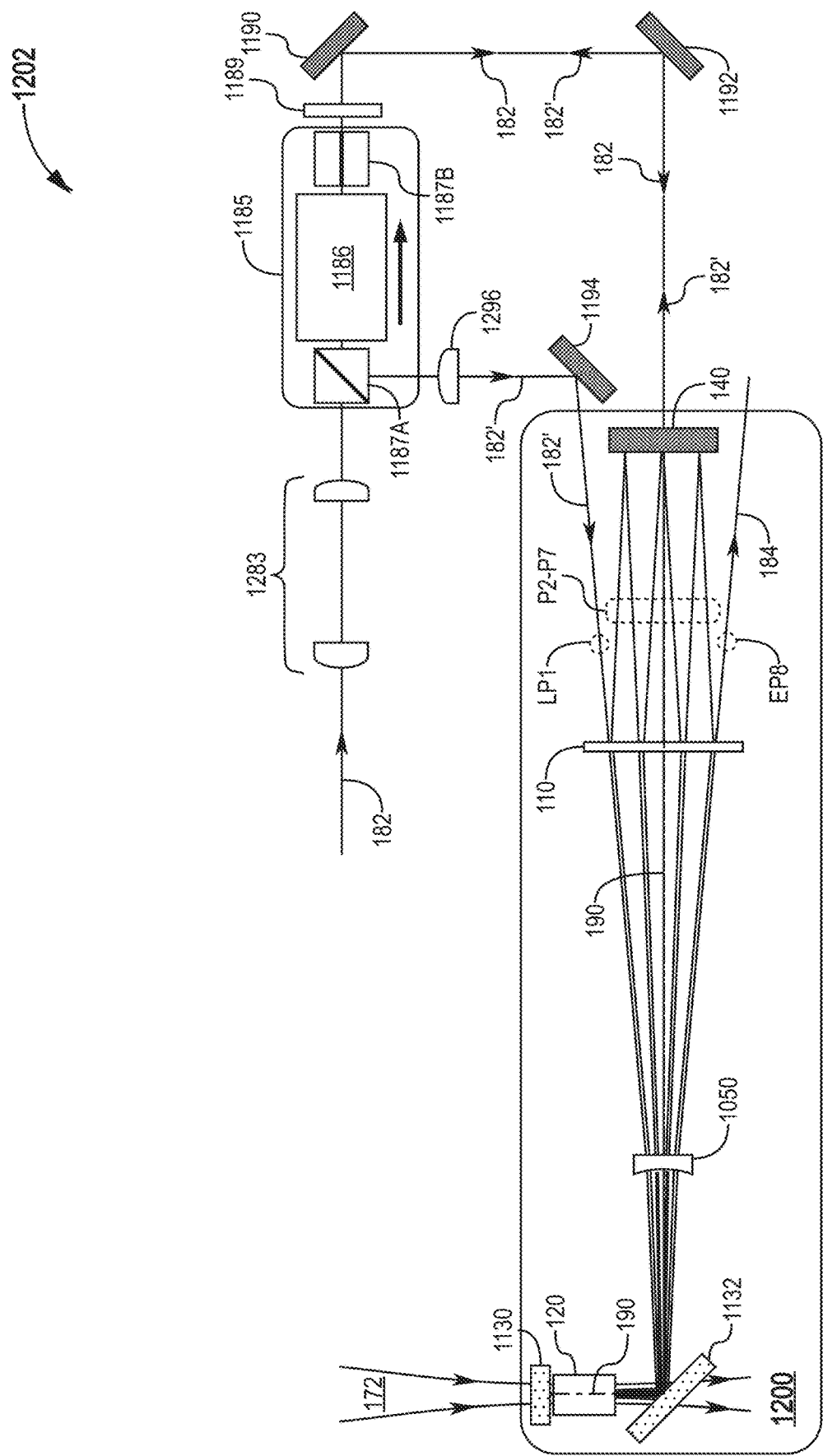
FIG. 12 illustrates a multipass laser amplifier with a no-optical-power refractive BSE, as implemented in a laser amplification system that enhances the amplification of the seed laser beam through additional on-axis passes of the seed laser beam through the amplifier, according to an embodiment.

FIG. 12 illustrates one multipass laser amplifier 1200 with no-optical-power refractive BSE 110, as implemented in one laser amplification system 1202 that enhances the amplification of seed beam 182 through additional on-axis passes of seed beam 182 through amplifier 1200. Amplifier 1200 is an embodiment of amplifier 1100 that does not include mirror 1160. System 1202 is an embodiment of system 102 that first directs seed beam 182 into amplifier 1200 to make two passes (forward and backward) through amplifier 1200 on longitudinal axis 190 to generate an intermediate amplified laser beam 182', and subsequently directs intermediate amplified beam 182' into amplifier 1200 to make several off-axis passes. The off-axis passes of intermediate amplified beam 182' include an initial pass along an inject path (e.g., inject path LP1), an even number of internal passes (e.g., along paths P2-P7), and a final pass along an eject path (e.g., eject path EP8), to generate amplified beam 184.

Each of the two on-axis passes goes through a central portion or opening in BSE 110. In one embodiment, BSE 110 is implemented as a BSE 200 (optionally adapted to achieve fewer or more than 6 internal passes), and the on-axis passes pass through non-refractive central portion 240 or an alternative central opening at the z-axis. In another embodiment, BSE 110 is implemented as monolithic BSE 500, and the on-axis passes pass through central planar plateau 580 or an alternative central opening formed therein. In yet another embodiment, BSE 110 is implemented as a plurality of prims 610 (e.g., triple-prism BSE 600), and the on-axis passes pass through an opening at the z-axis between prisms 610.

System 1202 may include several optical elements to direct pump beam 172 into amplifier 1100 through mirror 1130. These elements are discussed above in reference to FIG. 11.

To handle the launching and extraction of beams 182, 182', and 184, system 1202 includes (a) optical isolator 1185, (b) one or more steering optics (e.g., steering mirrors 1190 and 1192) that direct seed beam 182 transmitted by optical isolator 1185 into amplifier 1200 along longitudinal axis 190 and direct the resulting counter-propagating intermediate amplified beam 182' back to optical isolator 1185, and (c) one or more steering optics (e.g., a steering mirror 1194) that direct intermediate amplified beam 182' from optical isolator 1185 into amplifier 1200 along an off-axis inject path such as inject path LP1.

System 1202 may further include a beam shaping module 1283 that shapes the transverse mode of seed beam 182 prior to the on-axis passes. Beam shaping module 1283 is similar to beam shaping module 1183 except for potentially being adapted to a different propagation distance of seed beam 182 to amplifier 1200 since seed beam 182, in the case of system 1202, first enters amplifier 1200 along longitudinal axis 190. In addition, system 1202 may include one or more beam shaping optic 1296 (e.g., a lens) that shapes the transverse mode of intermediate amplified beam 182' prior to the off-axis passes. Beam shaping module 1283 and beam shaping optic 1296 may be configured to achieve a similar $1/e^2$ cross section for all passes through amplifier 1200, including the on-axis passes of seed beam 182 and the off-axis passes of intermediate amplified beam 182'. System 1202 may also include waveplate 1189, such that the on-axis passes and off-axis passes have the same polarization.

Without departing from the scope hereof, alternative arrangements of optical isolator 1185 and the paths of seed beam 182 and intermediate amplified beam 182' are possible. For example, with suitable placement of steering mirrors, optical isolator 1185 and the paths of seed beam 182 and intermediate amplified beam 182' may be rearranged such that optical isolator 1185 outputs seed beam 182 along longitudinal axis 190, or such that optical isolator 1185 outputs intermediate amplified beam 182' along inject path LP1.

Figure 14:
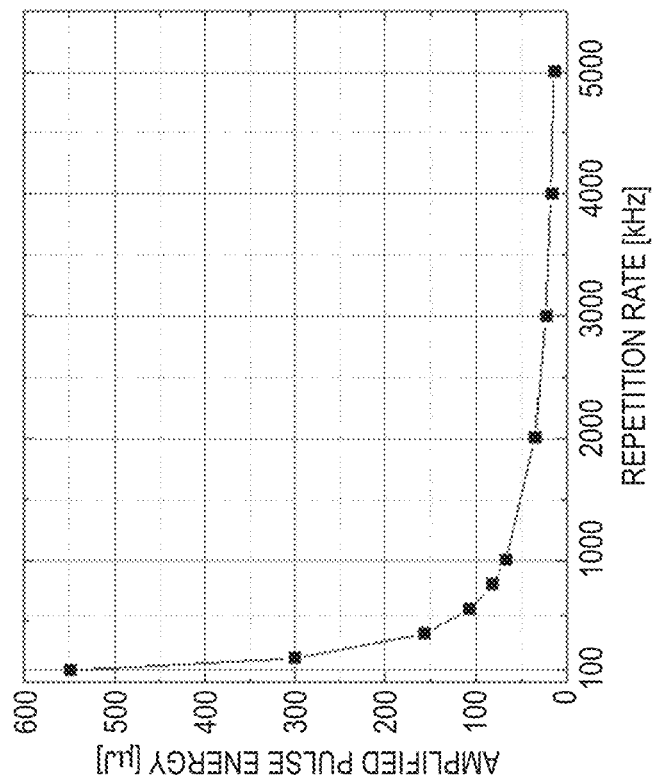
FIGS. 13 and 14 show exemplary amplified average power and amplified pulse energy achieved when using a 10-pass embodiment of the laser amplification system of FIG. 12, outfitted with the triple-prism BSE of FIG. 6, to amplify the output of a picosecond laser.
Figure 13:
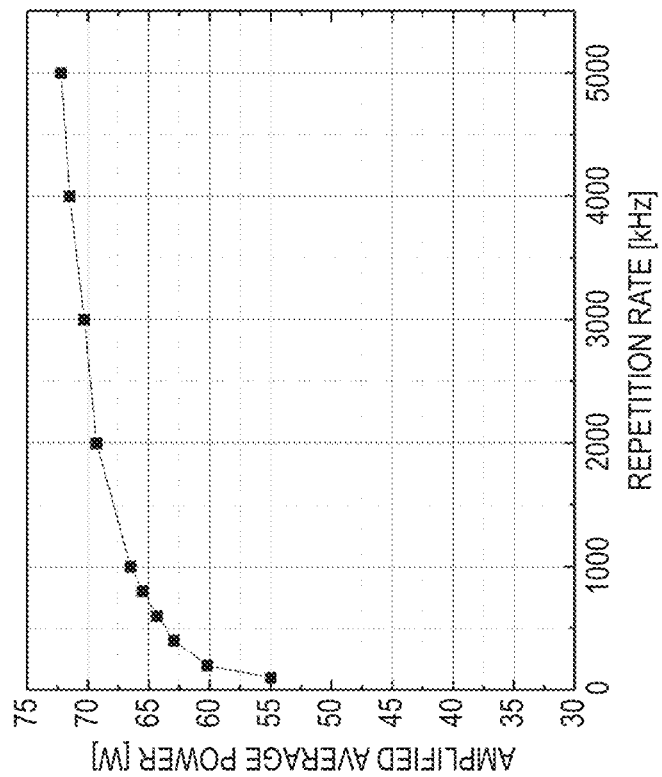

FIGS. 13 and 14 show example results achieved when using one 10-pass embodiment of amplification system 1202, outfitted with triple-prism BSE 600, to amplify the output of a picosecond laser. The 10 passes consist of two on-axis passes (forward and backward) on longitudinal axis 190, an inject pass along inject path LP1, six internal passes along paths P2-P7, and a final eject pass along eject path EP8. FIGS. 13 and 14 plot the average power and pulse energy, respectively, of amplified laser beam 184 as a function of the repetition rate of the picosecond laser. The pulse energy is the average power divided by the repetition rate.

The picosecond laser, used in this example, had a wavelength of 1064-nanometers. The pulse energy was nearly constant throughout the 100 kilohertz (kHz) to 5 MHz repetition-rate range depicted. The average input power of the resulting seed beam 182, before amplification by amplifier 1200, therefore depended on the repetition rate. For example, the average input power was approximately 1 milliwatt (mW) at a repetition rate of 100 kHz, approximately 10 mW at a repetition rate of 1 MHz, and approximately 40 milliwatt mW at a repetition rate of 5 MHz.

In this example, pump beam 172 was a continuous-wave laser beam with a power of around 165 watts and a wavelength of 888 nanometers. Pump beam 172 was shaped to produce a full-width-at-half-maximum diameter of 1.45 millimeters in gain crystal 120. Gain crystal 120 was implemented as a 30-millimeter long $Nd:YVO_4$ crystal.

FIGS. 13 and 14 show that the average power of amplified laser beam 184 increases with the repetition rate but starts to saturate at the higher repetition rates. At the lowest repetition rate, 100 kHz, more passes or a higher average input power of seed beam 182 would be needed to completely saturate the gain. Despite not saturating the gain at 100 kHz, a remarkable net gain of 55,000 is achieved. FIGS. 13 and 14 demonstrate, by example, the capability of the presently disclosed amplifiers to achieve a very high net gain and deliver amplification to a high average power.

Without departing from the scope hereof, the functionality achieved by any one of BSEs 110, 200, 400, 500, 600, and 800 may instead be achieved by a no-optical-power diffractive BSE. This diffractive BSE is, for example, a transmissive diffractive optical element (DOE) to perform the deflections as discussed above in reference to FIGS. 1-8. The diffractive BSE may be one monolithic DOE that deflects seed beam 182 in all the internal passes through the amplifier or it may comprise individual diffracting elements. In one example, each wedge 210 of BSE 200 is replaced by a DOE printed onto or written into a transmissive plate.

Figure 15:
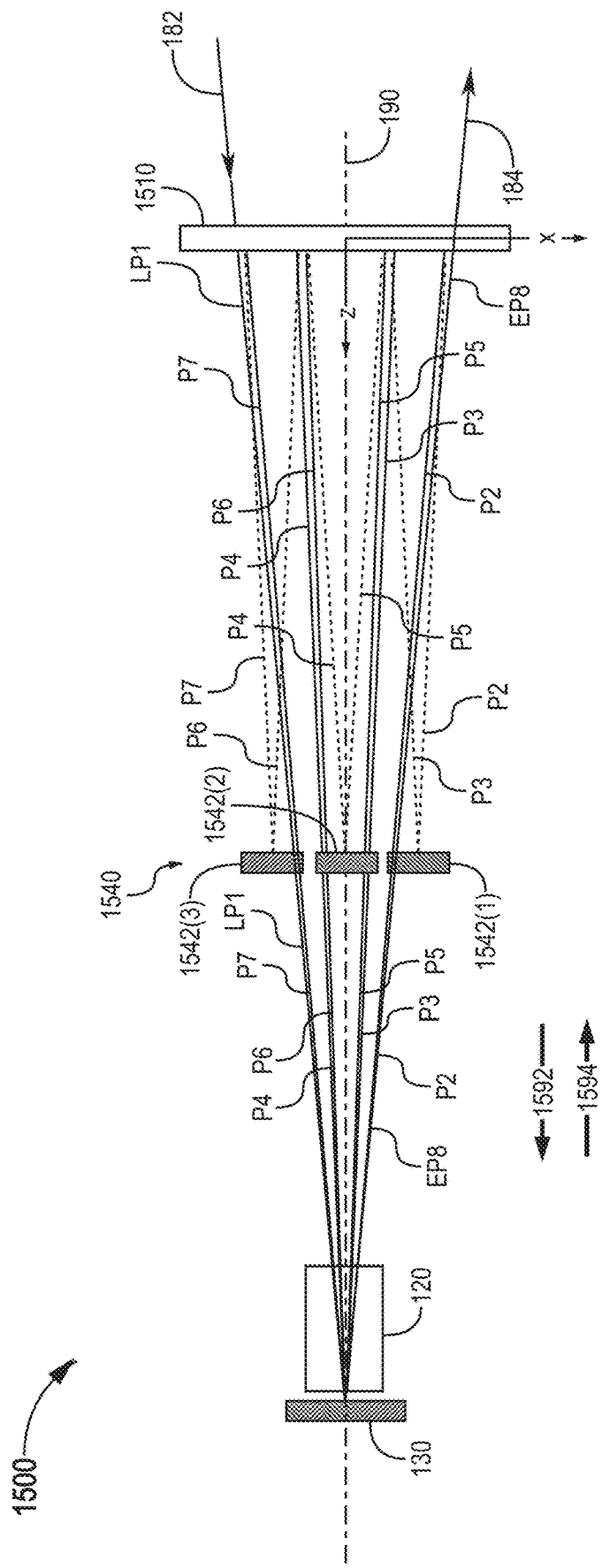
FIG. 15 illustrates a multipass laser amplifier that utilizes a no-optical-power reflective BSE to direct a seed laser beam through a laser-pumped gain crystal several times, according to an embodiment.

FIG. 15 illustrates one multipass laser amplifier 1500 that utilizes a no-optical-power reflective BSE 1510 to direct seed laser beam 182 through a laser-pumped gain crystal several times. Amplifier 1500 includes BSE 1510, gain crystal 120, mirror 130, and a mirror device 1540. Amplifier 1500 is a modification of amplifier 100, wherein refractive BSE 110 is replaced by reflective BSE 1510 in the same location relative to gain crystal 120, and mirror device 140 located at one end of amplifier 100 is replaced by mirror device 1540 located between reflective BSE 1510 and gain crystal 120. Whereas refractive BSE 110 steers seed beam 182 by refraction, reflective BSE 1510 steers seed beam 182 by reflection. The propagation paths of seed beam 182 in amplifier 100 between refractive BSE 110 and mirror device 140 are, in amplifier 1500, flipped to the side of BSE 1510 facing gain crystal 120.

In operation, seed beam 182 is injected into laser amplifier 1500 along inject path LP1 for a first pass through gain crystal 120, makes six internal passes along paths P2-P7 through gain crystal 120, and a final pass through gain crystal on eject path EP8. In amplifier 1500, each of paths P2-P7 extend between mirror 130 and mirror device 1540, and is reflected by BSE 1510. For clarity of illustration, paths P2-P7 are shown as solid lines on the legs between BSE 1510 and mirror 130, and as dashed lines on the legs between BSE 1510 and mirror device 1540. In amplifier 1500, inject path LP1 and eject path EP8 pass through or by both BSE 1510 and mirror device 1540. Alternatively, seed beam 182 is injected into and/or ejected from amplifier 1500 between BSE 1510 and gain crystal 120, for example with a mirror.

The $1/e^2$ cross section of seed beam 182, as it propagates between mirror 130 and mirror device 1540, is similar to that of seed beam 182 as it propagates between mirror 130 and mirror device 140 in amplifier 100. In particular, by virtue of BSE 1510 having no optical power, the size of seed beam 182 is relatively large in gain crystal 120 of amplifier 1500, and amplifier 1500 thus has similar benefits as amplifier 100 over conventional multipass amplifiers with lens-based beam steering.

Without departing from the scope hereof, amplifier 1500 may include defocusing lens 1050 (as in FIG. 10) between mirror device 1540 and gain crystal 120. Also without departing from the scope hereof, amplifier 1500 may include mirror 1160 (as in FIG. 11).

Since BSE 1510 steers seed beam 182 by reflection, rather than refraction, the steering of BSE 1510 may be insensitive to the wavelength of seed beam 182. In contrast, the refractive beam steering of BSE 110 is wavelength sensitive due to dispersion in the material of BSE 110. This wavelength sensitivity changes the paths of seed beam 182 through amplifier 100 and changes the exact locations of seed beam 182 in gain crystal 120 in amplifier 100. The spatial overlap between seed beam 182 and the pump beam in amplifier 100 is therefore wavelength dependent. As a result, the performance of amplifier 100 is generally best when the wavelength of seed beam 182 is at or near a certain design wavelength. Amplifier 1500, on the other hand, may perform well throughout a greater wavelength range. In the case of amplifier 1500, the limiting factors (other than the gain bandwidth of gain crystal 120) may be thermal lensing and dispersion in gain crystal 120, and/or dispersion in defocusing lens 1050 if included. In a comparison between examples of amplifier 100 and amplifier 1500, we found a three-fold improvement in the operational spectral bandwidth of amplifier 1500 over amplifier 100. This is an advantage when amplifying a compressed or uncompressed beam of ultrashort pulses having a broad spectral bandwidth. For example, a beam having a wavelength of 1000 nanometers and a Gaussian pulse duration less than 150 femtoseconds has a time-bandwidth-limited spectral bandwidth greater than 10 nanometers. On the other hand, amplifier 100 may be less sensitive to BSE surface errors and mechanical misalignment than amplifier 1500.

Directing the attention to BSE 1510, BSE 1510 reflects seed beam 182 for each of the internal passes of the seed beam 182 between mirror 130 and mirror device 1540, such that each of the internal passes (a) goes through gain crystal 120 for amplification of seed beam 182 and (b) is reflected by a different respective off-axis portion of BSE 1510 that is a distance away from longitudinal axis 190. For each pass of seed beam 182 that propagates from mirror device 1540 to mirror 130, and in a forward direction 1592 through gain crystal 120, BSE 1510 reflects seed beam 182 to steer seed beam 182 toward longitudinal axis 190. BSE 1510 thereby ensures that seed beam 182 passes through gain crystal 120 near or on longitudinal axis 190 to optimally overlap with a pump beam 172. In one example, gain crystal 120 is very close to mirror 130, and BSE 1510 is configured such that seed beam 182 reaches longitudinal axis 190 at mirror 130.

In one embodiment, for each internal pass that goes through gain crystal 120 in backward direction 1594, the reflection by BSE 1510 steers seed beam 182 such that its subsequent propagation path to mirror device 1540 and back to BSE 1510 is in a plane that is orthogonal to a radial axis associated with longitudinal axis 190. In another embodiment, the propagation of seed beam 182 between BSE 1510 and mirror device 1540 is not restricted to such planes. However, more complex beam steering by mirror device 1540 is then required.

As shown in FIG. 15, mirror device 1540 may include a plurality of mirrors 1540. Mirrors 1540 may be similar to mirrors 740 of FIG. 7, but flipped to face in the direction away from gain crystal 120. Alternatively, mirror device 1540 is a single mirror with appropriately located transmissive portions or openings for transmission of seed beam 182 as it propagates between BSE 1510 and gain crystal 120.

In the example depicted in FIG. 15, amplifier 1500 is an 8-pass amplifier with BSE 1510 being responsible for beam steering of the six internal passes. More generally, BSE 1510 is configured to beam steer an even number N of internal passes, such that amplifier 1500 is an (N+2)-pass amplifier, in a manner similar to that discussed above in reference to FIG. 1.

Amplifier 1500 may replace amplifier 100 in system 102, replace amplifier 1100 in system 1102, and replace amplifier 1200 in system 1202.

Figure 16B:
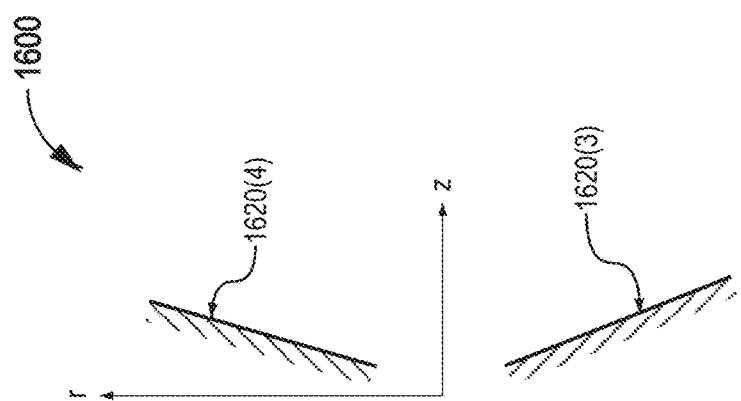
FIGS. 16A and 16B illustrate a no-optical-power reflective BSE based on a plurality of reflective planar surfaces arranged at oblique angles to the optical axis, according to an embodiment.
Figure 16A:
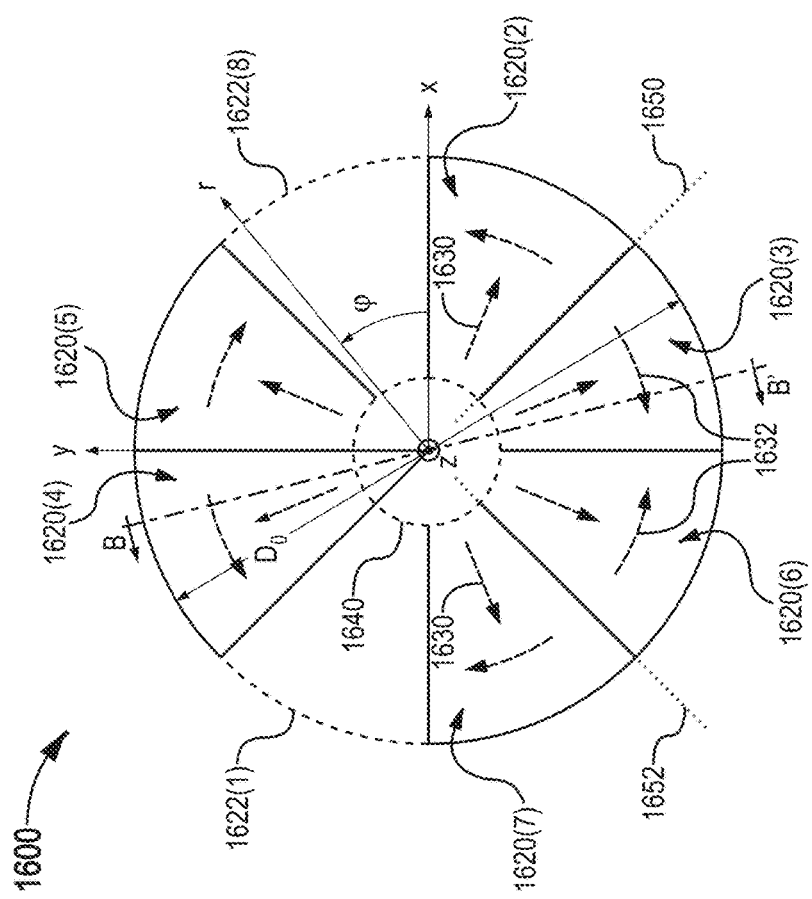

FIGS. 16A and 16B illustrate one no-optical-power reflective BSE 1600 based on a plurality of reflective planar surfaces arranged at oblique angles to the optical axis. BSE 1600 is an embodiment of BSE 1510 specifically configured to handle beam steering of the internal passes, respectively, of seed beam 182 through the 8-pass embodiment of amplifier 1500 depicted in FIG. 15. BSE 1600 includes six reflective planar surfaces 1620 arranged about a z-axis, forming the optical axis of BSE 1600. BSE 1600 may be considered a reflective analogue of refractive BSE 200.

FIG. 16A is a frontal view of BSE 1600 similar to that used for BSE 200 in FIG. 2. FIG. 16B is a cross-sectional view of surfaces of BSE 1600 with the cross section being taken in an rz-plane intersecting surfaces 1620(3) and 1620(4), as indicated by dash-dotted line B-B' in FIG. 16A. When implemented in amplifier 1500, BSE 1600 is oriented as indicated by the x- and z-axes in FIG. 15.

When implemented in amplifier 1500, the z-axis of BSE 1600 is aligned to longitudinal axis 190 and faces gain crystal 120. Each of the six surfaces 1620 handles the beam steering of a respective one of the internal passes of seed beam 182 through the 8-pass embodiment of amplifier 1500 depicted in FIG. 15. Specifically, surface 1620(2) reflects path P2 of seed beam 182, surface 1620(3) reflects path P3 of seed beam 182, etc.

The planarity of surfaces 1620 ensures that BSE 1600 has no optical power. Each surface 1620 is at an oblique angle to the xy-plane. The profile of surfaces 1620 is complementary to the profile of surfaces 620 of refractive BSE 600, in the sense that the profile of surfaces 1620 is the same as the profile of surfaces 620 reflected in the xy-plane. Each surface 1620 is tilted toward the z-axis, when viewed from the front. Surfaces 1620(2) and 1620(3) are tilted toward each other, surfaces 1620(4) and 1620(5) are tilted toward each other, and surfaces 1620(6) and 1620(7) are tilted toward each other, when viewed from the front.

Travel on any one of surfaces 1620 in a direction defined as the projection of a radial arrow 1630 onto the surface is associated with a shift in the positive z-axis direction. For clarity of illustration, radial arrows 1630 are labeled only at surfaces 1620(2) and 1620(7). Travel on any of one of surfaces 1620 in a direction defined as the projection of an azimuthal arrow 1632 onto the surface is also associated with a shift in the positive z-axis direction. For clarity of illustration, azimuthal arrows 1632 are labeled only at surfaces 1620(3) and 1620(6). The azimuthal directions associated with a shift in the positive z-axis direction of surfaces 1620(2) and 1620(3) are mutually opposite, the azimuthal directions associated with a shift in the positive z-axis direction of surfaces 1620(4) and 1620(5) are mutually opposite, and the azimuthal directions associated with a shift in the positive z-axis direction of surfaces 1620(6) and 1620(7) are mutually opposite. In one embodiment, surface 1620(3) is the mirror image of surface 1620(2) as reflected in a plane 1650 orthogonal to the plane of FIG. 16A, surface 1620(5) is the mirror image of surface 1620(4) as reflected in the yz-plane, and surface 1620(7) is the mirror image of surface 1620(6) as reflected in a plane 1652 orthogonal to the plane of FIG. 16A.

BSE 1600 may include transmissive portions 1622(1) and 1622(8) arranged to intersect inject path LP1 and eject path EP8, respectively. Instead of including transmissive portions 1622(1) and 1622(8), BSE 1600 may form one opening between surfaces 1620(4) and 1620(7) allowing passage of seed beam 182 along inject path LP1, and another opening between surfaces 1620(2) and 1620(5) allowing passage of amplified beam 184 along eject path EP8. In an embodiment, a central portion 1640 of BSE 1600 on the z-axis is transmissive, or BSE 1600 forms an opening at the z-axis. Central portion 1640 may be configured to allow on-axis passes of seed beam 182 through BSE 1600.

BSE 1600 may be a monolithic part forming all surfaces 1620. For example, BSE 1600 may be implemented as a modification of refractive BSE 500 forming reflective surfaces 1620 instead of transmissive surfaces 620. Alternatively, BSE 1600 is composed of a plurality of separate parts. For example, BSE 1600 may include three separate parts respectively forming surface pair 1620(2,3), surface pair 1620(4,5), and surface pair 1620(6,7). These three separate parts may be identical.

Without departing from the scope hereof, at least one surface 1620 of BSE 1600 may be curved, such that each such surface 1620 has a non-zero optical power corresponding to a focal length of at least one meter.

The size and shape of BSE 1600 in dimensions transverse to the z-axis may be similar to that of BSE 200.

BSE 1600 may be adapted to steer the path of seed beam 182 through amplifier 1500 in a manner that achieves fewer or more than 8 passes. Such adaptation may be accomplished by rearranging and changing the number of surface pairs in a manner similar to that discussed for wedge pairs in reference to FIG. 8.

Figure 17:
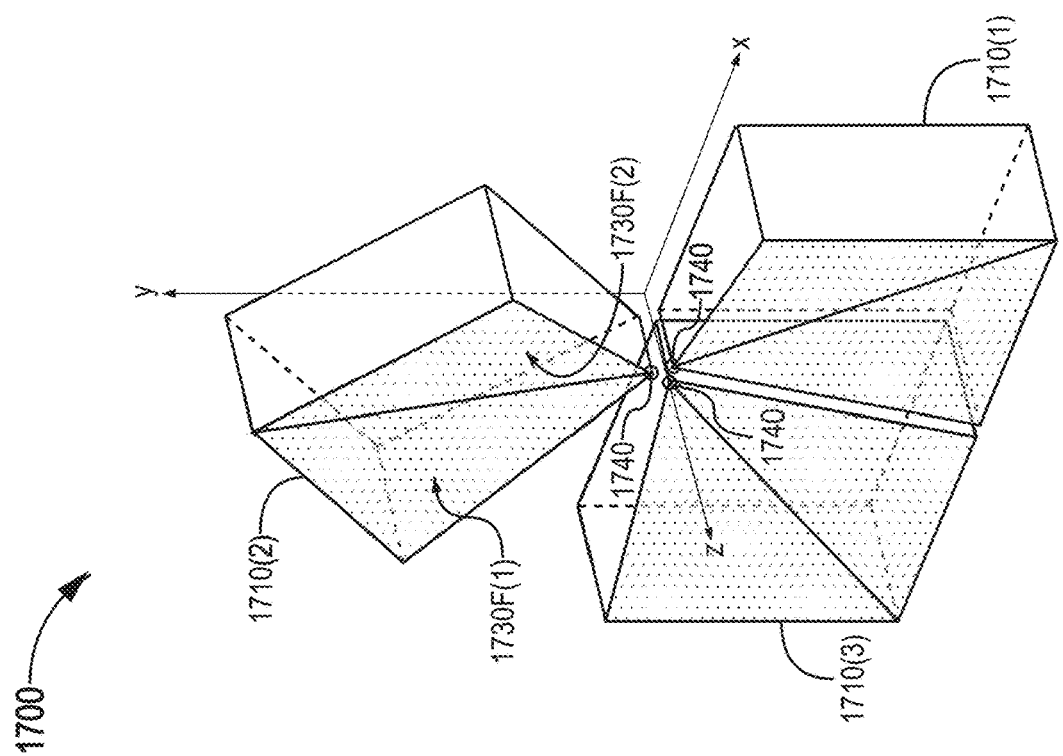
FIG. 17 illustrates a triple-prism no-optical-power reflective BSE that includes three reflective prisms, according to an embodiment.

FIG. 17 illustrates one triple-prism no-optical-power reflective BSE 1700 that includes three reflective prisms 1710(1), 1710(2), and 1710(3). BSE 1700 is an embodiment of BSE 1600, and forms a reflective analogue to refractive triple-prism BSE 600. Although prims 1710(1-3) may be different from each other, manufacturing simplicity and cost benefit from prisms 1710(1-3) being identical, and the following discussion of BSE 1700 pertains to such an embodiment. Each prism 1710 has planar reflective front surfaces 1730F(1) and 1730F(2) that form an example of surface pair 1610(2,3) of BSE 1600.

Each prism 1710 corresponds to a quarter of a square pyramid, optionally including an additional square base, and has a point 1740 of smallest thickness. Points 1740 are arranged to face the z-axis. Front surfaces 1730F(1) and 1730F(2) face in the positive z-axis direction. The back surfaces of each prism 1710, facing in the negative z-axis direction, may be planar for ease of manufacturing. Furthermore, for ease of mounting (e.g., on fixture 650), the back surfaces of prisms 1710(1-3) may be coplanar and parallel to the xy-plane. Front surfaces 1730F(1) and 1730F(2) are at an oblique angle to the xy-plane. In one embodiment, each prism 1710 is a glass prism with a high-reflective coating on front surfaces 1730F(1) and 1730F(2).

The arrangement of prisms 1710 in BSE 1700 forms one opening between prisms 1710(1) and 1710(2) and another opening between prisms 1710(2) and 1710(3). These two openings allow passage of seed beam 182 along inject path LP1 and amplified beam 184 along eject path EP8 in amplifier 1500. In one implementation, prisms 1710 of BSE 1700 are mounted to a common fixture (not shown in FIG. 17).

Without departing from the scope hereof, one or both of surfaces 1730F(1) and 1730F(2) of at least one prism 1710 of BSE 1700 may be curved, such that each such prism 1710 has a non-zero optical power corresponding to a focal length of at least one meter.

Although not shown in FIG. 17, each prism 1710 may be chamfered to form an opening sufficiently large to accommodate transmission of on-axis passes of seed beam 182.

Figure 18:
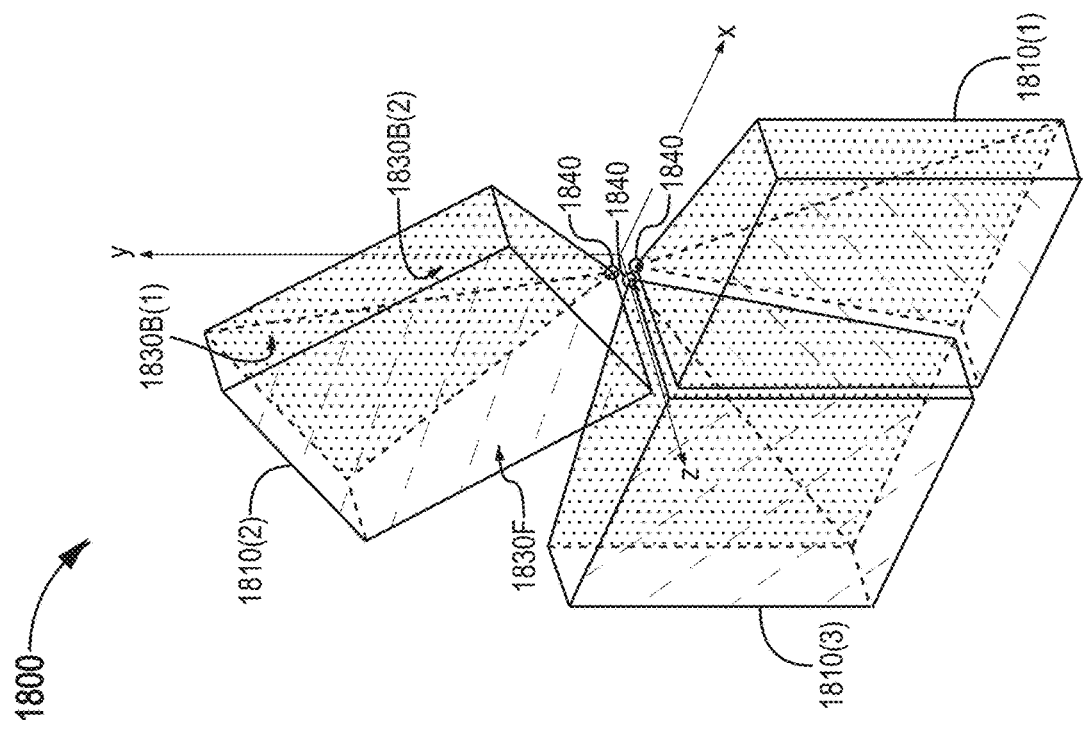
FIG. 18 illustrates another triple-prism no-optical-power reflective BSE that includes three reflective prisms, according to an embodiment.

FIG. 18 illustrates another triple-prism no-optical-power reflective BSE 1800 that includes three reflective prisms 1810(1), 1810(2), and 1810(3). BSE 1800 is an embodiment of BSE 1600, and forms a reflective analogue to refractive triple-prism BSE 600. Although prims 1810(1-3) may be different from each other, manufacturing simplicity and cost benefit from prisms 1810(1-3) being identical and the following discussion of BSE 1800 pertains to such an embodiment.

Each prism 1810 corresponds to a quarter of a square pyramid, optionally including an additional square base, and has an apex 1840 of greatest thickness. Apexes 1840 are arranged to face the z-axis. Each prism 1810 has a planar transmissive front surface 1830F (dashed hatching in FIG. 18) on the side of prism 1710 facing in the positive z-axis direction. Each prism 1810 also has planar reflective back surfaces 1830B(1) and 1830B(2) (dotted shading in FIG. 18) on the side of prism 1810 facing in the negative z-axis direction. Back surfaces 1830B(1) and 1830B(2) form an example of surface pair 1610(2,3) of BSE 1600. Back surfaces 1830B(1) and 1830B(2) may have a high-reflective coating, and front surface 1830F may have an antireflective coating. The footprint of prims 1810(1-3) in the xy-plane may be as indicated by outlines 570(1-3), respectively, in FIG. 5C. Front surfaces 1830F of all prisms 1810 may be coplanar, for example for ease of mounting on a common fixture such as fixture 650.

In operation, when BSE 1800 is implemented in amplifier 1500, each pass of seed beam 182 is transmitted into one prism 1810 through front surface 1830F to propagate toward back surface 1830B(1) or back surface 1830B(2), reflected by the back surface to propagate toward front surface 1830F, and transmitted out of the prism through front surface 1830F. The arrangement of prisms 1810 in BSE 1800 forms one opening between prisms 1810(1) and 1810(2) and another opening between prisms 1810(2) and 1810(3). These two openings allow passage of seed beam 182 along inject path LP1 and eject path EP8 in amplifier 1500. In one implementation, prisms 1810 of BSE 1800 are mounted to a common fixture (not shown in FIG. 18).

While the dominant beam steering effect of BSE 1800 is imparted through the reflection by back surfaces 1830B(1) and 1830B(2), some refraction occurs at front surfaces 1830F. Therefore, BSE 1800 does not entirely eliminate the dispersion effect of refractive BSE 100. However, the dispersion effects introduced by BSE 1800 are less severe than those introduced by BSE 100. In addition, because back surfaces 1830B(1) and 1830B(2) of each prism 1810 face away from each other by a slight amount, rather than toward each other as is the case for front surfaces 1730F(1) and 1730F(2) of BSE 1700, BSE 1800 may be simpler to manufacture than BSE 1700.

Without departing from the scope hereof, one or more of surfaces 1830B(1), 1830B(2), and 1830F of at least one prism 1810 of BSE 1800 may be curved, such that each such prism 1810 has a non-zero optical power corresponding to a focal length of at least one meter.

Although not shown in FIG. 18, each prism 1810 may be chamfered to form an opening sufficiently large to accommodate transmission of on-axis passes of seed beam 182.

The present invention is described above in terms of a preferred embodiment and other embodiments. The invention is not limited, however, to the embodiments described and depicted herein. Rather, the invention is limited only by the claims appended hereto.

What is claimed is:

1. A multipass laser amplifier, comprising:
a first mirror;
a mirror device;
a gain crystal positioned on a longitudinal axis of the multipass laser amplifier between the first mirror and the mirror device;
a beam-steering element positioned on the longitudinal axis between the gain crystal and the mirror device, the beam-steering element having no optical power and being configured to deflect a laser beam, by refraction or diffraction, for each of multiple passes of the laser beam between the first mirror and the mirror device, such that each of the multiple passes goes through the gain crystal for amplification of the laser beam and goes through a different respective off-axis portion of the beam-steering element that is a distance away from the longitudinal axis, the multiple passes alternating between backward passes in direction toward the mirror device and forward passes in direction toward the first mirror, wherein, for each forward pass directly followed by a backward pass, the forward pass and the directly following backward pass intersect the beam-steering element on diagonally opposite sides of the longitudinal axis and have an angular displacement from one another about the longitudinal axis of 180 degrees.

2. The multipass laser amplifier of claim 1, wherein the beam-steering element is configured to, for each of the multiple passes in direction toward the first mirror, deflect the laser beam toward the longitudinal axis.

3. The multipass laser amplifier of claim 1, further comprising a defocusing lens positioned on the longitudinal axis between the beam-steering element and the gain crystal.

4. The multipass laser amplifier of claim 1, wherein the beam-steering element forms, away from the longitudinal axis, first and second non-deflective portions, or openings, configured to transmit the laser beam without deflection so as to allow (a) injection of the laser beam into the multipass laser amplifier through the first non-deflective portion or opening onto a launch path making a first pass through the gain crystal in direction toward the gain crystal and (b) ejection of the laser beam from the multipass laser amplifier when propagating through the second non-deflective portion or opening on an eject path after making a last pass through the gain crystal, the first pass preceding the multiple passes, the last pass succeeding the multiple passes.

5. The multipass laser amplifier of claim 4, further comprising
a second mirror arranged to retroreflect the laser beam, after passing through the beam-steering element on the eject path, back into the multipass laser amplifier for backwards repetition of the last pass, the multiple passes, and the first pass.

6. The multipass laser amplifier of claim 4, wherein, on the longitudinal axis, the beam-steering element further forms an on-axis non-deflective portion or opening and the mirror device forms an on-axis transmissive portion or opening, so as to allow the laser beam to enter and exit the multipass laser amplifier via the on-axis transmissive portion or opening of the mirror device to make two additional passes through the multipass laser amplifier.

7. The multipass laser amplifier of claim 6, further comprising:
an optical isolator including a polarizing beamsplitter, a Faraday rotator, and a polarizer, the optical isolator being arranged to transmit the laser beam when received at an input port of the polarizing beamsplitter from a laser source; and
one or more steering mirrors arranged to define a beam path for the laser beam that (a) takes the laser beam, as transmitted by the optical isolator, from the polarizer and into the multipass laser amplifier via the on-axis transmissive portion or opening of the mirror device to make the two additional passes, (b) returns the laser beam to the polarizer after the two additional passes, and (c) takes the laser beam from an output port of the polarizing beamsplitter into the multipass laser amplifier on the launch path to make the first pass, the multiple passes, and the last pass.

8. The multipass laser amplifier of claim 1, wherein the beam-steering element is configured to deflect the laser beam by refraction and includes a series of transmissive wedges distributed about the longitudinal axis of the beam-steering element, each transmissive wedge being defined by two planar surfaces facing in opposite directions along the longitudinal axis, wherein thickness, along the longitudinal axis, of each transmissive wedge between the two planar surfaces decreases with distance from the longitudinal axis and decreases along one azimuthal direction about the longitudinal axis.

9. The multipass laser amplifier of claim 8, wherein the series of transmissive wedges includes six transmissive wedges.

10. The multipass laser amplifier of claim 1, wherein the multiple passes consist of a series of forward- and backward-pass pairs, and wherein:
the beam-steering element includes a plurality of separate prisms each configured to deflect both the forward pass and the backward pass of a respective one of the forward- and backward-pass pairs; and
the mirror device includes a plurality of separate mirrors each configured to reflect the backward pass of a respective one of the forward- and backward-pass pairs.

11. The multipass laser amplifier of claim 1, wherein the first mirror is a curved mirror, and the mirror device includes one or more curved mirrors.

12. The multipass laser amplifier of claim 1, wherein the beam-steering element is configured to deflect the laser beam by diffraction and includes a series of diffractive optical elements distributed about the longitudinal axis of the beam-steering element.

13. The multipass laser amplifier of claim 1, further comprising a pump laser for generating a pump beam, the first mirror being configured to transmit the pump beam to the gain crystal.

14. The multipass laser amplifier of claim 1, wherein:
the beam-steering element includes a plurality of separate prisms each configured to deflect both the forward passes and the backward passes of a respective one of a plurality of backward- and forward-pass pairs, wherein, for each backward- and forward-pass pair, the backward pass is directly succeeded by the forward pass; and
the mirror device includes a plurality of separate mirrors each configured to reflect each of the backward passes directly succeeding a forward pass.

15. The multipass laser amplifier of claim 8, wherein the series of transmissive wedges is arranged as a series of transmissive wedge pairs, each transmissive wedge pair including two adjacent ones of the transmissive wedges and being symmetric with respect to reflection in a plane spanned by the longitudinal axis and an associated radial axis between the two transmissive wedges of the transmissive wedge pair.

16. The multipass laser amplifier of claim 15, wherein the series of transmissive wedge pairs further is interrupted twice by two respective non-wedged portions, each non-wedged portion being defined by two parallel surfaces facing in opposite directions along the longitudinal axis.

* * * * *